(12) United States Patent
Iwazaki et al.

(10) Patent No.: US 8,047,064 B2
(45) Date of Patent: Nov. 1, 2011

(54) APPARATUS AND METHOD FOR DETECTING ABNORMALITY OF INTER-CYLINDER AIR-FUEL RATIO DISPERSION IN MULTI-CYLINDER INTERNAL COMBUSTION ENGINE

(75) Inventors: Yasushi Iwazaki, Ebina (JP); Toru Kidokoro, Hadano (JP); Hiroshi Sawada, Gotenba (JP); Keiji Imamura, Susuno (JP); Fumihiko Nakamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 429 days.

(21) Appl. No.: 12/393,597

(22) Filed: Feb. 26, 2009

(65) Prior Publication Data

US 2009/0211350 A1 Aug. 27, 2009

(30) Foreign Application Priority Data

Feb. 27, 2008 (JP) ................................. 2008-046885

(51) Int. Cl.
*G01M 15/10* (2006.01)
(52) U.S. Cl. ................................. 73/114.72; 73/114.75
(58) Field of Classification Search ............... 73/114.71, 73/114.72, 114.75
See application file for complete search history.

(56) References Cited

U.S. PATENT DOCUMENTS

| | | | |
|---|---|---|---|
| 6,220,017 B1* | 4/2001 | Tayama et al. ................. | 60/277 |
| 7,519,467 B2* | 4/2009 | Katoh ........................... | 701/103 |
| 7,721,591 B2* | 5/2010 | Maegawa ..................... | 73/114.72 |
| 7,926,330 B2* | 4/2011 | Huang et al. ................ | 73/114.38 |
| 2009/0260347 A1* | 10/2009 | Iwazaki et al. .................. | 60/277 |
| 2010/0168986 A1* | 7/2010 | Iwazaki et al. ................ | 701/103 |
| 2011/0054761 A1* | 3/2011 | Sawada et al. ................ | 701/103 |
| 2011/0113870 A1* | 5/2011 | Suetsugu et al. ........... | 73/114.72 |
| 2011/0113871 A1* | 5/2011 | Suetsugu et al. ........... | 73/114.72 |
| 2011/0179774 A1* | 7/2011 | Iihoshi et al. .................. | 60/276 |

FOREIGN PATENT DOCUMENTS

| | | |
|---|---|---|
| JP | 2000-220489 | 8/2000 |
| JP | 2007-113515 | 5/2007 |
| JP | 2007-154840 | 6/2007 |

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

An apparatus or a method for detecting an abnormality of inter-cylinder air-fuel ratio dispersion in a multi-cylinder internal combustion engine according to the invention is equipped with a catalytic element that purifies exhaust gas of hydrogen, a first air-fuel ratio sensor that detects an air-fuel ratio of exhaust gas that has not passed through the catalytic element, a second air-fuel ratio sensor that detects an air-fuel ratio of exhaust gas that has passed through the catalytic element, a device that detects an abnormality of inter-cylinder air-fuel ratio dispersion on the basis of a divergence state of a detected value of a second air-fuel ratio to a lean side from a detected value of a first air-fuel ratio, and a device that forcibly reduces fuel injection amounts in cylinders individually when an abnormality on dispersion is detected by the abnormality detector, detects a divergence state of the detected value of the second air-fuel ratio to the lean side from the detected value of the first air-fuel ratio at this time, and specifies as an abnormal cylinder that one of the cylinders in which a value indicating this divergence state has become smaller than at a time of detection of the abnormality of dispersion.

8 Claims, 23 Drawing Sheets

F I G . 7
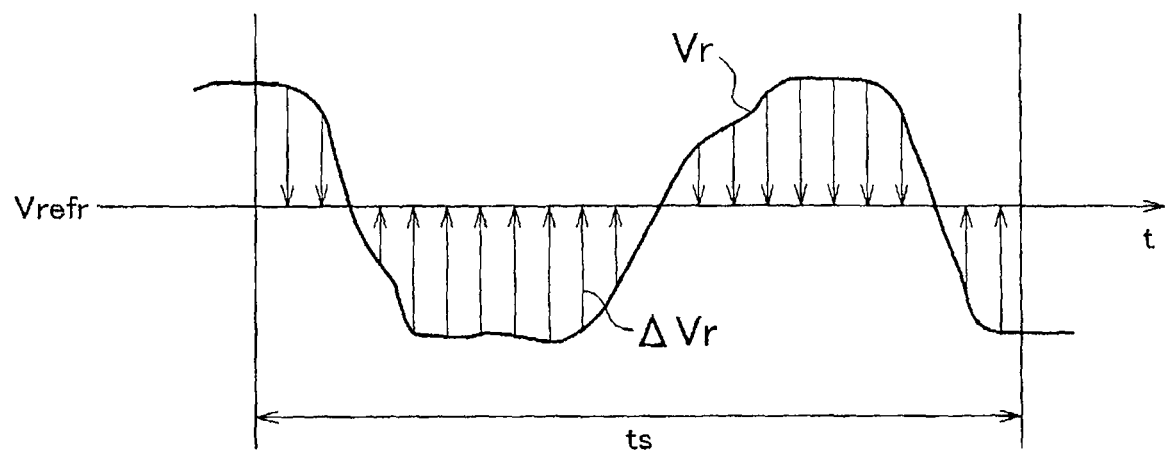

FIG. 9A
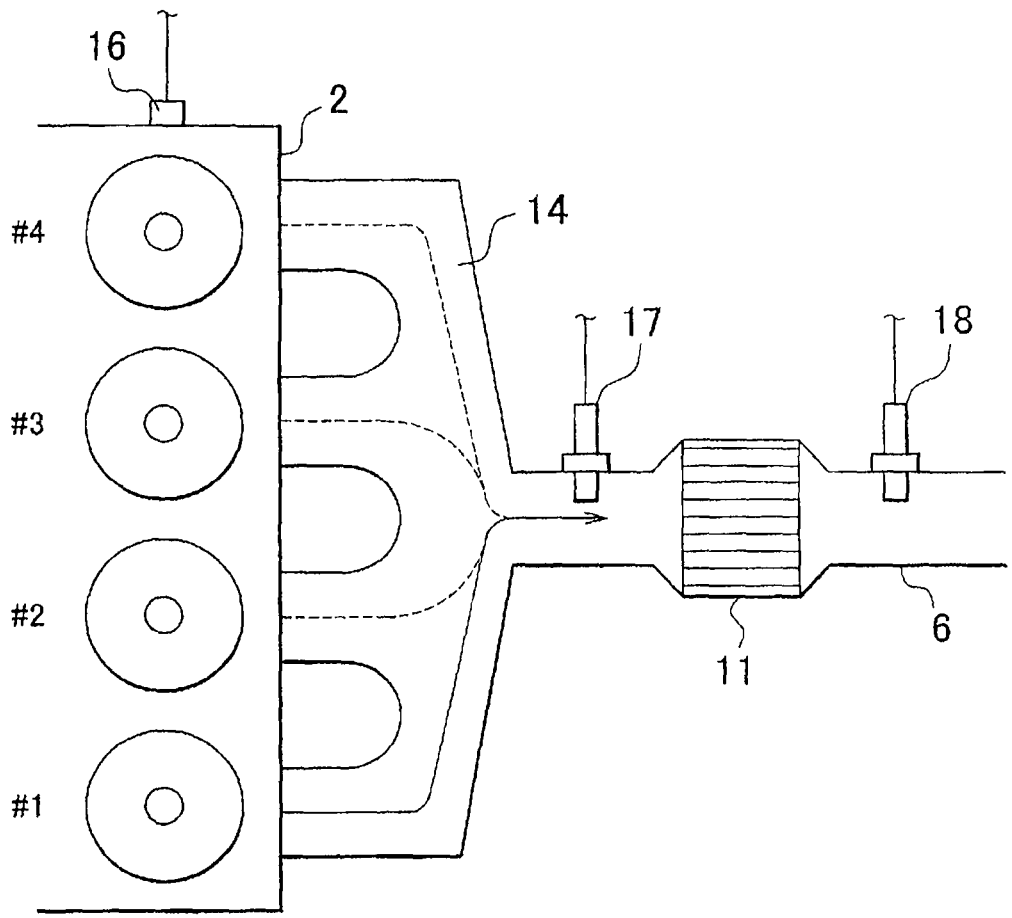
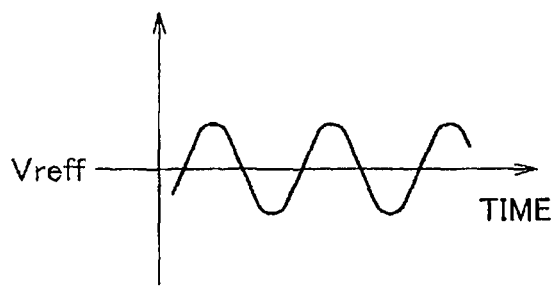
FIG. 9B
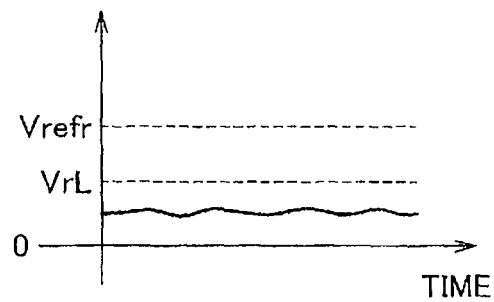
FIG. 9C

0%  0%  0%  0%
1  #2  #3  #4    STOICHIOMETRIC

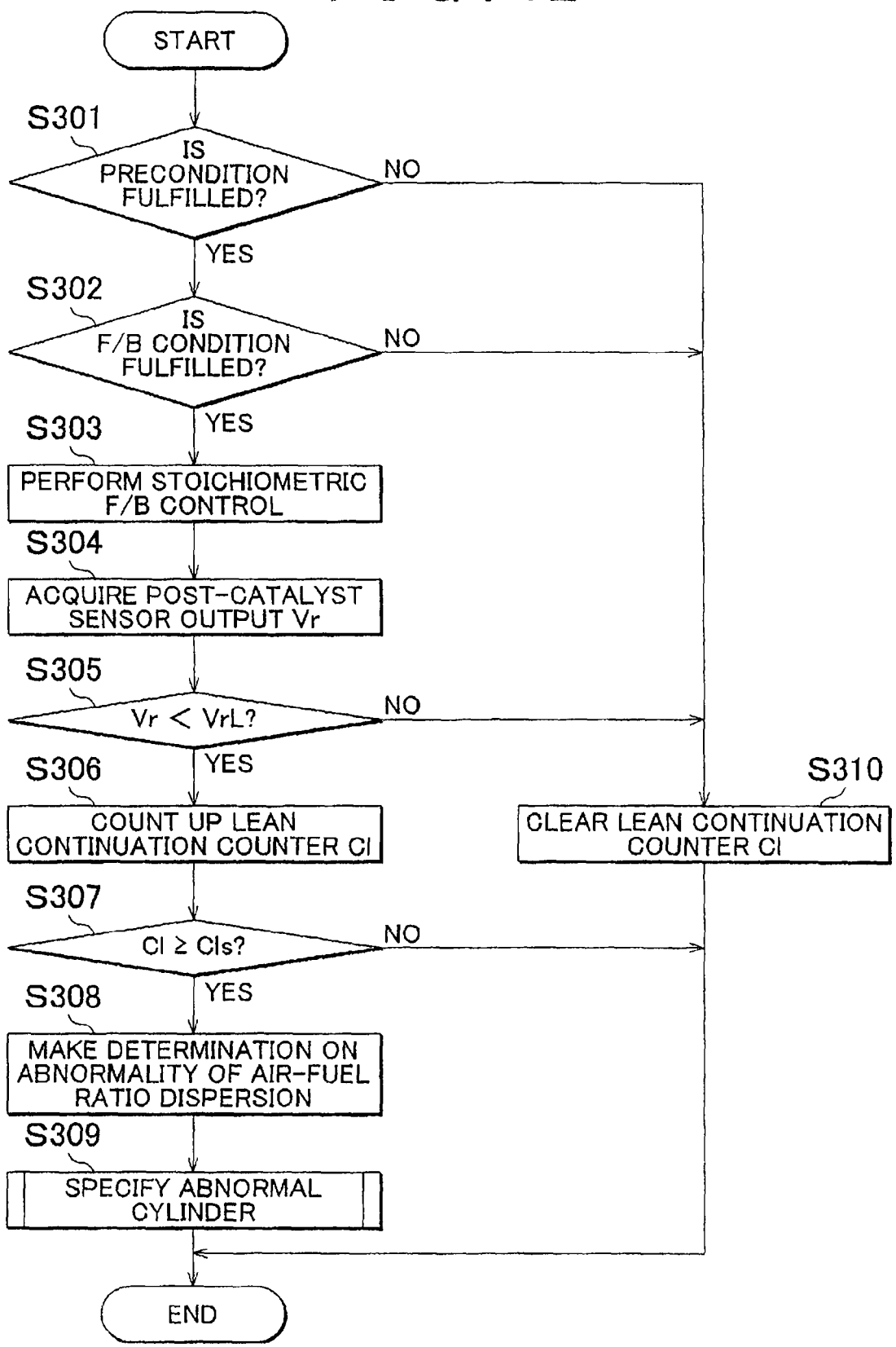

FIG. 17A
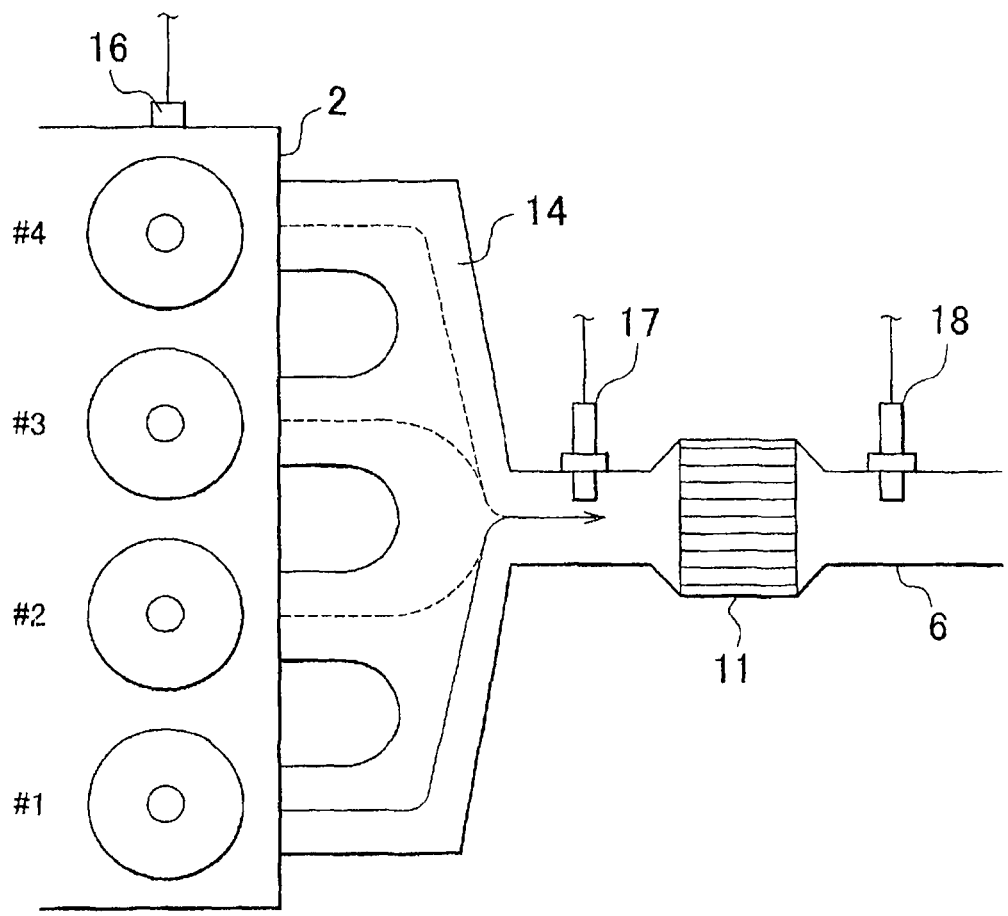
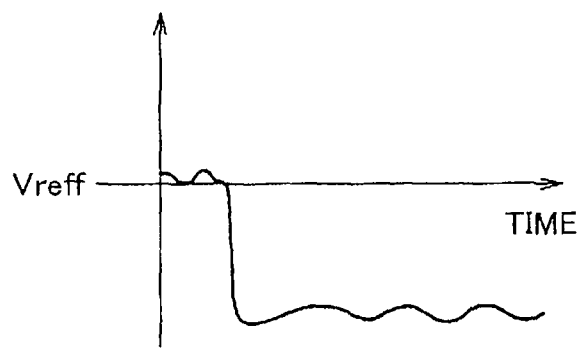
FIG. 17B
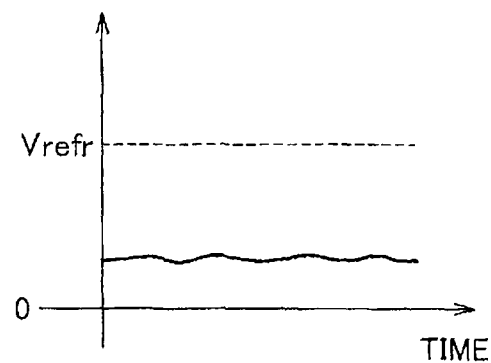
FIG. 17C

FIG. 19A
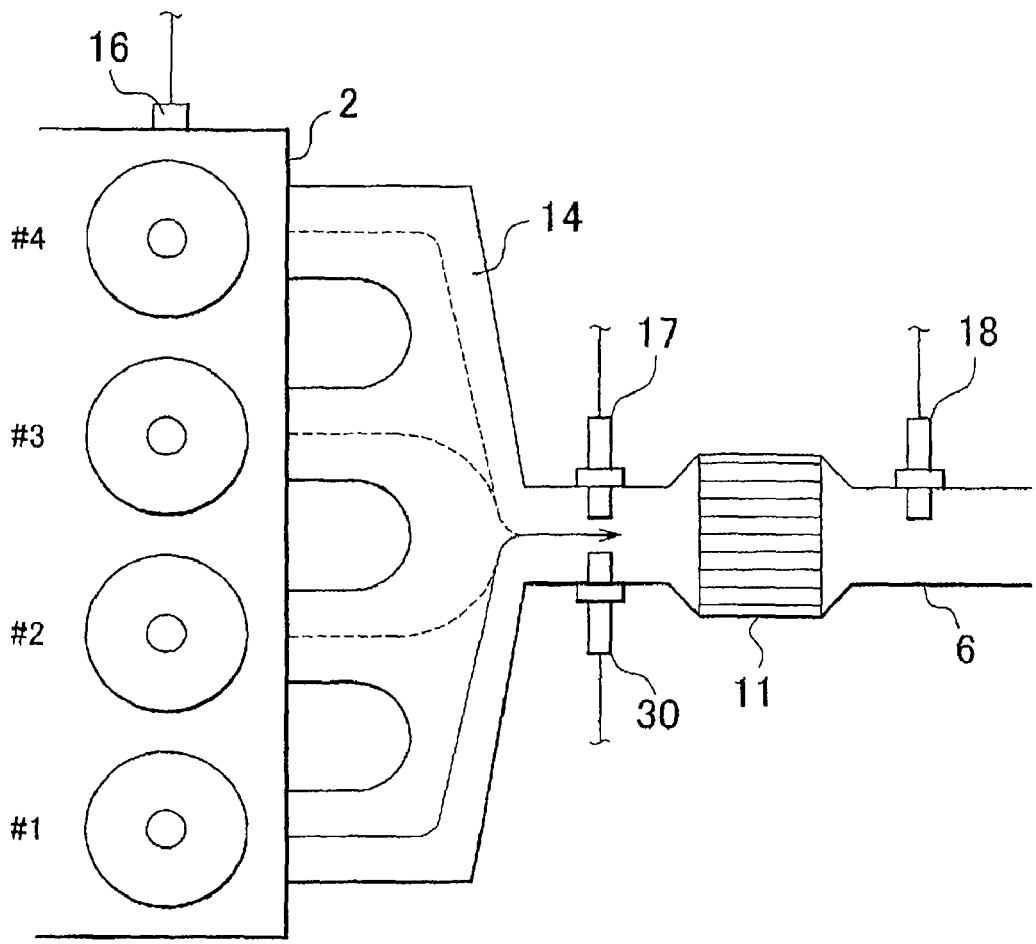
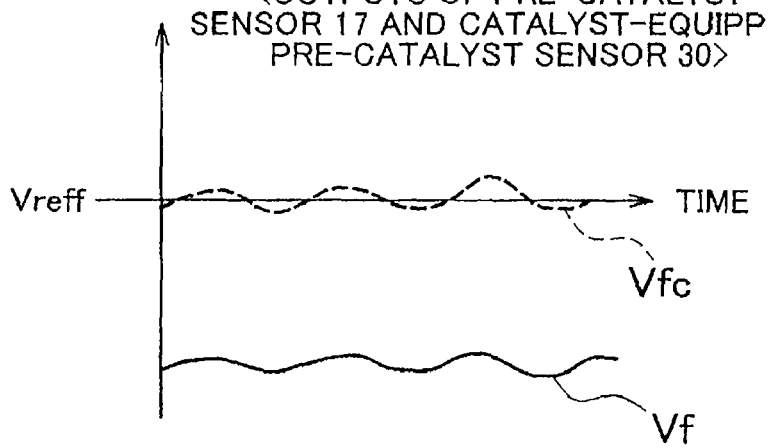
FIG. 19B

APPARATUS AND METHOD FOR DETECTING ABNORMALITY OF INTER-CYLINDER AIR-FUEL RATIO DISPERSION IN MULTI-CYLINDER INTERNAL COMBUSTION ENGINE

INCORPORATION BY REFERENCE

The disclosure of Japanese Patent Application No. 2008-046885 filed on Feb. 27, 2008 including the specification, drawings and abstract is incorporated herein by reference in its entirety.

BACKGROUND OF THE INVENTION

1. Field of the Invention

The invention relates to an apparatus and a method for detecting an abnormality of inter-cylinder air-fuel ratio dispersion in a multi-cylinder internal combustion engine, and more particularly, to an apparatus and a method for detecting that air-fuel ratios relatively greatly disperse among cylinders in a multi-cylinder internal combustion engine.

2. Description of the Related Art

In general, in an internal combustion engine equipped with an exhaust gas purification system utilizing a catalyst, the control of the mixing ratio between air and fuel in the mixture burned in the internal combustion engine, namely, the air-fuel ratio is indispensable, with a view to purifying exhaust gas of noxious components contained therein by a catalyst with high efficiency. In order to perform this air-fuel ratio control, an air-fuel ratio sensor is provided in an exhaust passage of the internal combustion engine, and feedback control is performed such that the air-fuel ratio detected by the air-fuel ratio sensor coincides with a predetermined target air-fuel ratio.

On the other hand, in a multi-cylinder internal combustion engine, the same control amount is usually used for all cylinders to perform air-fuel ratio control. Therefore, the actual air-fuel ratios may disperse among the cylinders even when air-fuel ratio control is performed. When the degree of dispersion is low in this case, the dispersion can be absorbed through air-fuel ratio feedback control, and exhaust gas can be purified of noxious components contained therein by the catalyst as well. Thus, the exhaust emission properties are not influenced, and no particular problem arises. However, when the air-fuel ratios greatly disperse among the cylinders due to, for example, a malfunction of a fuel injection system in one or each of some of the cylinders, the exhaust emission properties deteriorate to cause a problem. Such great air-fuel ratio dispersion as deteriorates the exhaust emission properties is desired to be detected as an abnormality. Especially in the case of an internal combustion engine for an automobile, in order to prevent in advance a vehicle with deteriorated exhaust emission properties from running, there is a demand to detect an abnormality of inter-cylinder air-fuel ratio dispersion in an on-vehicle (onboard) state. Recently there have also been moves to legislate against this abnormality.

Japanese Patent Application Publication No. 2000-220489 (JP-A-2000-220489) discloses a control apparatus for a multi-cylinder engine having a single air-fuel ratio sensor disposed in an exhaust pipe aggregate portion of the engine which calculates individual air-fuel ratios in respective cylinders and controls air-fuel ratios in the cylinders respectively. According to this control apparatus, an air-fuel ratio is calculated on the basis of an output signal of the air-fuel ratio sensor and then analyzed into frequency components within a predetermined range. An air-fuel ratio in each of the cylinders is estimated on the basis of these analyzed frequency components.

When air-fuel ratios in the respective cylinders can be estimated as in the case of the apparatus described in Japanese Patent Application Publication No. 2000-220489 (JP-A-2000-220489), an abnormality of air-fuel ratio dispersion may be detected by comparing these air-fuel ratios with one another. However, in the apparatus described in Japanese Patent Application Publication No. 2000-220489 (JP-A-2000-220489), fluctuations in the air-fuel ratio that are synchronized with the rotation of the engine need to be detected by the air-fuel ratio sensor on a short cycle. Thus, the air-fuel ratio sensor is required to exhibit very high responsiveness. Even if there is such a sensor, it may fail to function when it degrades and decreases in responsiveness. Further, an ECU with high-speed data sample or high processing capacity is required. It is difficult for a high-responsiveness sensor to detect only fluctuations in the air-fuel ratio separately from noise, and there is a lack of robustness. There is also a restriction on the condition for operating the engine as well. For example, the engine is operated only in a stationary state so as to minimize disturbances. To detect fluctuations in the air-fuel ratio that are synchronized with the rotation of the engine, it is preferable to install the sensor as close as possible to a combustion chamber. In this case, however, there is an apprehension that a sensor element may be damaged by moisture in exhaust gas. The shape of an exhaust manifold and the installation position of the sensor need to be selected such that a good amount of gas flows onto the air-fuel ratio sensor. Even when air-fuel ratios in the respective cylinders are estimated to attempt to detect an abnormality of air-fuel ratio dispersion, there are still many problems to be solved. It is therefore difficult to say that this control apparatus is practical.

SUMMARY OF THE INVENTION

Thus, the invention has been made in consideration of the aforementioned circumstances, and provides an apparatus and a method for practically and accurately detecting an abnormality of inter-cylinder air-fuel ratio dispersion in a multi-cylinder internal combustion engine.

According to one aspect of the invention, there is provided an apparatus for detecting an abnormality of inter-cylinder air-fuel ratio dispersion in a multi-cylinder internal combustion engine. This apparatus is equipped with a catalytic element that is disposed in an exhaust passage of the multi-cylinder internal combustion engine to purify exhaust gas by oxidizing at least hydrogen contained in the exhaust gas, a first air-fuel ratio sensor that detects a first exhaust gas air-fuel ratio as an air-fuel ratio of exhaust gas that has not passed the catalytic element, a second air-fuel ratio sensor that detects a second exhaust gas air-fuel ratio as an air-fuel ratio of exhaust gas that has passed the catalytic element, an abnormality detector that detects an abnormality of inter-cylinder air-fuel ratio dispersion on a basis of a divergence state of a detected value of the second exhaust gas air-fuel ratio to a lean side from a detected value of the first exhaust gas air-fuel ratio, and an abnormal cylinder specifier that forcibly reduces fuel injection amounts in cylinders individually when an abnormality of dispersion is detected by the abnormality detector, detects a divergence state of the detected value of the second exhaust gas air-fuel ratio to the lean side from the detected value of the first exhaust gas air-fuel ratio at this time, and specifies as an abnormal cylinder that one of the cylinders in which a value indicating the divergence state has become smaller than at a time of detection of the abnormality of dispersion.

Further, according to another aspect of the invention, there is provided a method for detecting an abnormality of inter-cylinder air-fuel ratio dispersion in a multi-cylinder internal combustion engine equipped with a catalytic element that is disposed in an exhaust passage of the multi-cylinder internal combustion engine to purify exhaust gas by oxidizing at least hydrogen contained in the exhaust gas, a first air-fuel ratio sensor that detects a first exhaust gas air-fuel ratio as an air-fuel ratio of exhaust gas that has not passed through the catalytic element, and a second air-fuel ratio sensor that detects a second exhaust gas air-fuel ratio as an air-fuel ratio of exhaust gas that has passed through the catalytic element. This method for detecting the abnormality includes detecting an abnormality of inter-cylinder air-fuel ratio dispersion on a basis of a divergence state of a detected value of the second exhaust gas air-fuel ratio to a lean side from a detected value of the first exhaust gas air-fuel ratio, and forcibly reducing fuel injection amounts in cylinders individually when an abnormality of dispersion is detected by the abnormality detector, detecting a divergence state of the detected value of the second exhaust gas air-fuel ratio to the lean side from the detected value of the first exhaust gas air-fuel ratio at this time, and specifying as an abnormal cylinder that one of the cylinders in which a value indicating the divergence state has become smaller than at a time of detection of the abnormality of dispersion.

When the air-fuel ratio in one or some of the cylinders deviates to the rich side, the amount of hydrogen in exhaust gas tends to increase extremely. On the other hand, when exhaust gas containing hydrogen passes through the catalytic element, the hydrogen is oxidized and the exhaust gas is purified. Therefore, the detected value of the first exhaust gas air-fuel ratio of exhaust gas that has not passed through the catalytic element and hence has not been purified of hydrogen is deviant to the rich side from the detected value of the second exhaust gas air-fuel ratio of exhaust gas that has passed through the catalytic element and has been purified of hydrogen due to the influence of hydrogen. To put it the other way around, the detected value of the second exhaust gas air-fuel ratio is deviant to the lean side from the detected value of the first exhaust gas air-fuel ratio due to the influence of hydrogen. Hence, an abnormality of inter-cylinder air-fuel ratio dispersion is detected on the basis of this deviation (divergence) state to the lean side. The amount of this deviation to the lean side is larger when only the air-fuel ratio in one or each of some of the cylinders is deviant to the rich side than when the air-fuel ratios of all the cylinders are equivalently and uniformly deviant, because the amount of hydrogen in exhaust gas is larger in the former case than in the latter case. Accordingly, an abnormality of inter-cylinder air-fuel ratio dispersion can be detected as a phenomenon distinct from uniform deviation of the air-fuel ratios in all the cylinders, by monitoring this deviation state to the lean side. Since, for example, the air-fuel ratio sensor does not require high responsiveness, high practicality is obtained. Besides, an abnormality of dispersion can be detected with high accuracy.

Further, an abnormal cylinder constituting a cause of an abnormality of dispersion can be specified. Therefore, necessary maintenance, for example, the replacement of an injector in the abnormal cylinder or the like can be swiftly and appropriately carried out at a later repair stage. As a result, a significant improvement in practicality can be achieved.

Preferably, the first air-fuel ratio sensor is disposed in the exhaust passage upstream of the catalytic element, the second air-fuel ratio sensor is disposed in the exhaust passage downstream of the catalytic element, and an air-fuel ratio control device that performs main air-fuel ratio control such that the detected value of the first exhaust gas air-fuel ratio coincides with a first predetermined target air-fuel ratio and performs sub air-fuel ratio control such that the detected value of the second exhaust gas air-fuel ratio coincides with a second predetermined target air-fuel ratio is provided.

Further, preferably, the abnormality detector detects an abnormality of dispersion when the second exhaust gas air-fuel ratio continues to be detected as a value leaner than the first target air-fuel ratio for a time equal to or longer than a predetermined time during control performed by the air-fuel ratio control device. The abnormal cylinder specifier acquires a detected value of the second exhaust gas air-fuel ratio at a time of forcible reduction of the fuel injection amounts in the respective cylinders and specifies as an abnormal cylinder that one of the cylinders in which the detected value is richer than a value detected at a time of detection of the abnormality of dispersion, during control performed by the air-fuel ratio control device.

For example, it is assumed that an abnormality has occurred in the injector of one or each of some of the cylinders and the air-fuel ratio in the or each of the cylinders has greatly deviated to the rich side. In this case, when main air-fuel ratio control is performed, the total air-fuel ratio of exhaust gas after the confluence of exhaust gas from all the cylinders is controlled to the first target air-fuel ratio. However, the air-fuel ratio in the or each of the cylinders is much richer than the first target air-fuel ratio, and the air-fuel ratio in the other or each of the other cylinders is leaner than the first target air-fuel ratio. Only taken as a whole, the air-fuel ratio of exhaust gas is in the vicinity of the first target air-fuel ratio. Besides, a large amount of hydrogen is generated from the or each of the cylinders. Consequently, the output of the first air-fuel ratio sensor erroneously indicates, as the first target air-fuel ratio, an air-fuel ratio that has deviated to the rich side from a true air-fuel ratio.

On the other hand, when exhaust gas containing hydrogen passes through the catalytic element, it is purified of hydrogen and the influence thereof is eliminated. Accordingly, the output of the second air-fuel ratio sensor indicates the true air-fuel ratio, namely, an air-fuel ratio leaner than the first target air-fuel ratio.

Therefore, when the second air-fuel ratio sensor detects the second exhaust gas air-fuel ratio leaner than the first target air-fuel ratio for a time equal to or longer than a predetermined time although the first exhaust gas air-fuel ratio is controlled to the first target air-fuel ratio through main air-fuel ratio control, the occurrence of an abnormality of inter-cylinder air-fuel ratio dispersion is detected. This difference between the air-fuel ratios before and behind the catalyst is regarded as ascribable to the generation of a remarkably large amount of hydrogen resulting from a malfunction of the injector or the like in one or each of some of the cylinders.

Further, when the fuel injection amount in each of the cylinders is forcibly reduced during the performance of main/sub air-fuel ratio control, there arises thereafter a difference in characteristic. That is, the detected value of the second exhaust gas air-fuel ratio remarkably changes to the rich side in the case of an abnormal cylinder, but does not change very much in the case of a normal cylinder. Thus, using this difference in characteristic, an abnormal cylinder is specified.

Preferably, the air-fuel ratio control device calculates a control amount for the sub air-fuel ratio control on a basis of an output of the second air-fuel ratio sensor, the abnormality detector detects an abnormality of dispersion when the control amount becomes equal to or larger than a predetermined value with which the second exhaust gas air-fuel ratio is corrected further to the rich side during control performed by the air-fuel ratio control device, and the abnormal cylinder specifier acquires a value of the control amount at a time of forcible reduction of the fuel injection amount in each of the cylinders during control performed by the air-fuel ratio control device, and specifies as an abnormal cylinder that one of the cylinders in which the value of the control amount is smaller than a value at a time of detection of the abnormality of dispersion.

When an abnormality of inter-cylinder air-fuel ratio dispersion occurs due to a malfunction or the like of the injector in one or each of some of the cylinders, the second air-fuel ratio sensor continuously detects a lean value. Therefore, the control amount for sub air-fuel ratio control is a value with which the air-fuel ratio is corrected to the rich side so as to counterbalance this deviation to the lean side. Hence, using this phenomenon, the occurrence of an abnormality of inter-cylinder air-fuel ratio dispersion is detected when the control amount becomes equal to or larger than the predetermined value with which the second exhaust gas air-fuel ratio is corrected further to the rich side. Further, when the fuel injection amount in each of the cylinders is forcibly reduced during main/sub air-fuel ratio control, there arises thereafter a difference in characteristic. That is, the control amount changes to a smaller value in the case of an abnormal cylinder, but does not change very much in the case of a normal cylinder. Thus, using this difference in characteristic, an abnormal cylinder is specified.

Preferably, the air-fuel ratio control device forcibly sets the first target air-fuel ratio in the main air-fuel ratio control to a value richer than a reference value, the abnormality detector detects an abnormality of dispersion when the second exhaust gas air-fuel ratio continues to be detected as a value leaner than the second target air-fuel ratio for a time equal to or longer than a predetermined time, and the abnormal cylinder specifier acquires a detected value of the second exhaust gas air-fuel ratio at a time of forcible reduction of the fuel injection amount in each of the cylinders during control performed by the air-fuel ratio control device, and specifies as an abnormal cylinder that one of the cylinders in which the detected value is richer than a value detected at a time of detection of the abnormality of dispersion.

In the case where an abnormality of inter-cylinder air-fuel ratio dispersion occurs, the second exhaust gas air-fuel ratio is lean due to the influence of hydrogen even when the first exhaust gas air-fuel ratio has been controlled to the first target air-fuel ratio. On the other hand, extending this phenomenon, the second exhaust gas air-fuel ratio is lean even if the first exhaust gas air-fuel ratio is forcibly controlled to a value richer than the first target air-fuel ratio. Thus, using this phenomenon, the abnormality of inter-cylinder air-fuel ratio dispersion is detected. Meanwhile, when the fuel injection amount in each of the cylinders is forcibly reduced during this forcible rich control, there arises thereafter a difference in characteristic. That is, the detected value of the second exhaust gas air-fuel ratio remarkably changes to the rich side in the case of an abnormal cylinder, but does not change very much in the case of a normal cylinder. Thus, using this difference in characteristic, an abnormal cylinder is specified.

Preferably, the catalytic element is disposed in a sensor element of the second air-fuel ratio sensor, the abnormality detector detects an abnormality of dispersion when the detected value of the second exhaust gas air-fuel ratio is leaner than the detected value of the first exhaust gas air-fuel ratio by a value equal to or larger than a predetermined value, and the abnormal cylinder specifier acquires the detected value of the second exhaust gas air-fuel ratio at a time of forcible reduction of the fuel injection amount in each of the cylinders, and specifies as an abnormal cylinder that one of the cylinders in which the detected value has become closer to the detected value of the first exhaust gas air-fuel ratio than at a time of detection of the abnormality of dispersion.

In this case, the second air-fuel ratio sensor detects the second exhaust gas air-fuel ratio after exhaust gas is purified of hydrogen by the catalytic element disposed in the sensor element. Therefore, when there is an abnormality of inter-cylinder air-fuel ratio dispersion, the output of the second air-fuel ratio sensor more greatly diverges to the lean side than the output of the first air-fuel ratio sensor. Accordingly, an abnormality of inter-cylinder air-fuel ratio dispersion can be detected by monitoring a difference between these outputs. On the other hand, when the fuel injection amount in each of the cylinders is forcibly reduced, there arises thereafter a difference in characteristic. That is, the difference between the outputs decreases in the case of an abnormal cylinder, but does not change very much in the case of a normal cylinder. Thus, using this difference in characteristic, an abnormal cylinder is specified.

Preferably, the first target air-fuel ratio and the second target air-fuel ratio are set equal to a stoichiometric air-fuel ratio.

According to another aspect of the invention, there is provided an apparatus for detecting an abnormality of inter-cylinder air-fuel ratio dispersion in a multi-cylinder internal combustion engine which is characterized by being equipped with a hydrogen concentration sensor disposed in an exhaust passage of the multi-cylinder internal combustion engine to detect a concentration of hydrogen in exhaust gas, an abnormality detector that detects an abnormality of inter-cylinder air-fuel ratio dispersion on a basis of an output of the hydrogen concentration sensor, and an abnormal cylinder specifier that forcibly reduces a fuel injection amount in each of cylinders when an abnormality of dispersion is detected by the abnormality detector, acquires an output of the hydrogen concentration sensor at this time, and specifies as an abnormal cylinder that one of the cylinders in which the output indicates that the concentration of hydrogen has become lower than at a time of detection of the abnormality of dispersion. It should be noted herein that it is also preferable for the abnormality detector to determine that there is an abnormality of inter-cylinder air-fuel ratio dispersion when the concentration of hydrogen detected by the hydrogen concentration sensor is equal to or higher than a predetermined value.

According to still another aspect of the invention, there is provided a method for detecting an abnormality of inter-cylinder air-fuel ratio dispersion in a multi-cylinder internal combustion engine equipped with a hydrogen concentration sensor disposed in an exhaust passage of the multi-cylinder internal combustion engine to detect a concentration of hydrogen in exhaust gas. This method for detecting the abnormality includes determining that there is an abnormality of inter-cylinder air-fuel ratio dispersion when the concentration of hydrogen detected by the hydrogen concentration sensor is equal to or higher than a predetermined value, forcibly reducing a fuel injection amount in each of cylinders when an occurrence of an abnormality of dispersion is detected, acquiring an output of the hydrogen concentration sensor at this time, and specifying as an abnormal cylinder that one of the cylinders in which the output indicates that the concentration of hydrogen has become lower than at a time of detection of the abnormality of dispersion.

When an abnormality of inter-cylinder air-fuel ratio dispersion occurs, the concentration of hydrogen in exhaust gas increases. Accordingly, using this phenomenon, the abnormality of inter-cylinder air-fuel ratio dispersion can be detected. Further, when the fuel injection amount in each of the cylinders is forcibly reduced, there arises thereafter a difference in characteristic. That is, the concentration of hydrogen in exhaust gas decreases in the case of an abnormal cylinder, but remains high in the case of a normal cylinder. Thus, using this difference in characteristic, an abnormal cylinder can be specified.

According to the invention, an excellent effect of making it possible to provide a practical and accurate apparatus and a practical and accurate method for detecting an abnormality of inter-cylinder air-fuel ratio dispersion in a multi-cylinder internal combustion engine is achieved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 7 is a graph representing an output difference of the post-catalyst sensor and how the difference is integrated;

FIGS. 9A, 9B, and 9C are diagrams for explaining abnormality detection according to the first embodiment of the invention, each showing a case where the air-fuel ratio in one cylinder is deviant to a rich side from the air-fuel ratios in the other three cylinders;

FIG. 12 is a flowchart showing a routine of abnormality detection according to the first embodiment of the invention;

FIGS. 17A, 17B, and 17C are diagrams for explaining abnormality detection according to the third embodiment of the invention;

FIGS. 19A and 19B are diagrams for explaining abnormality detection according to the fourth embodiment of the invention;

DETAILED DESCRIPTION OF EMBODIMENTS

The best modes for carrying out the invention will be described hereinafter on the basis of the accompanying drawings.

Figure 1:
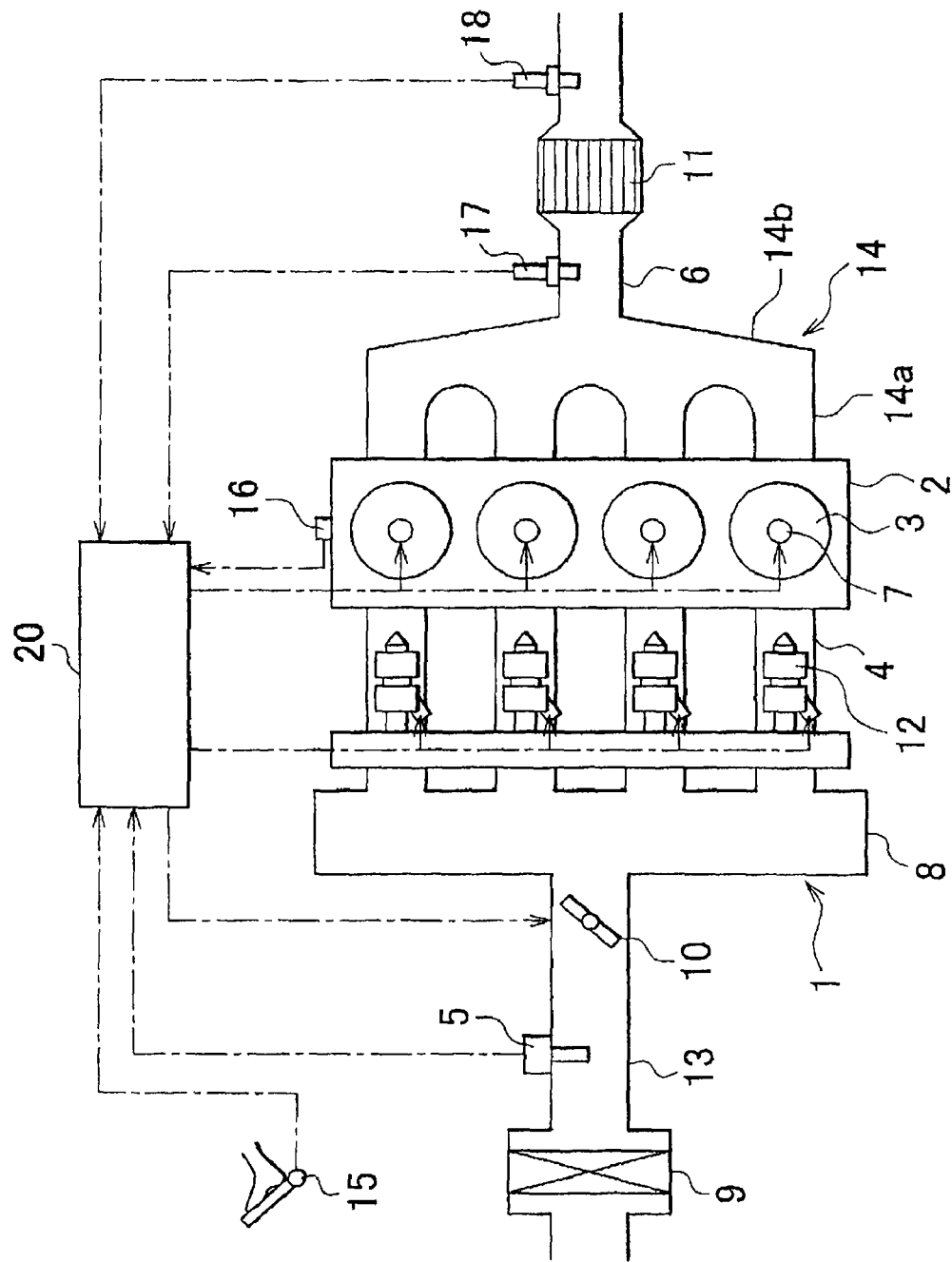
FIG. 1 is a schematic diagram of an internal combustion engine to which each of the embodiments of the invention is applied.

FIG. 1 is a schematic diagram of an internal combustion engine according to the first embodiment of the invention. As shown in FIG. 1, in an internal combustion engine 1, a mixture of fuel and air is burned inside combustion chambers 3 formed in a cylinder block 2, and pistons are moved in a reciprocating manner within the combustion chambers 3 to generate power. The internal combustion engine 1 according to this embodiment of the invention is a multi-cylinder internal combustion engine for an automobile, more specifically, a spark ignition internal combustion engine or a gasoline engine with four cylinders arranged in parallel with one another. However, the internal combustion engine to which the invention is applicable is not limited thereto. As long as the invention is applied to a multi-cylinder internal combustion engine, the number of cylinders thereof, the type thereof, and the like are not limited in particular.

Although not shown, intake valves for opening/closing intake ports and exhaust valves for opening/closing exhaust ports are disposed for the cylinders respectively in the cylinder head of the internal combustion engine 1. The respective intake valves and the respective exhaust valves are opened/closed by cam shafts respectively. A top portion of the cylinder head is fitted with ignition plugs 7 for igniting the mixture in the combustion chambers 3 for the cylinders respectively.

The intake ports of the respective cylinders are connected to a surge tank 8 as an intake air collecting chamber via branch pipes 4 for the respective cylinders. An intake pipe 13 is connected upstream of the surge tank 8, and an air cleaner 9 is provided at an upstream end of the intake pipe 13. An airflow meter 5 for detecting an intake air amount and an electronically controlled throttle valve 10 are integrated, in this order from an upstream side, with the intake pipe 13. An intake passage is formed by the intake ports, the branch pipes, the surge tank 8, and the intake pipe 13.

Injectors (fuel injection valves) 12 for injecting fuel into the intake passage, especially into the intake ports are disposed for the cylinders respectively. Fuel injected from the injectors 12 is mixed with intake air to form a mixture. This mixture is sucked into the combustion chambers 3 when the intake valves open. The mixture is then compressed by the pistons, ignited by the ignition plugs 7, and burned.

On the other hand, exhaust ports of the respective cylinders are connected to an exhaust manifold 14. The exhaust manifold 14 is composed of branch pipes 14a for the respective cylinders and an exhaust gas collecting portion 14b. The branch pipes 14a constitute an upstream portion of the exhaust manifold 14, and the exhaust gas collecting portion 14b constitutes a downstream portion of the exhaust manifold 14. An exhaust pipe 6 is connected downstream of the exhaust gas collecting portion 14b. An exhaust passage is formed by the exhaust port, the exhaust manifold 14, and the exhaust pipe 6. The exhaust pipe 6 is mounted with a catalyst 11 constructed as a three-way catalyst. This catalyst 11 constitutes the catalytic element mentioned in the invention. A first air-fuel ratio sensor for detecting an air-fuel ratio of exhaust gas and a second air-fuel ratio sensor for detecting an air-fuel ratio of exhaust gas, namely, a pre-catalyst sensor 17 and a post-catalyst sensor 18 are installed upstream and downstream of the catalyst 11 respectively. These sensors, namely, the pre-catalyst sensor 17 and the post-catalyst sensor 18 are installed in the exhaust passage at positions immediately before and behind the catalyst 11 respectively, and detect an air-fuel ratio on the basis of a concentration of oxygen in exhaust gas. As described above, the single pre-catalyst sensor 17 is installed in the exhaust passage as an exhaust gas confluence portion.

The ignition plug 7, the throttle valve 10, the injectors 12, and the like, which are described above, are electrically connected to an electronic control unit (hereinafter referred to as the ECU) 20 as a control device. The ECU 20 includes a CPU, a ROM, a RAM, input/output ports, a storage device, and the like, which are not shown in the drawing. Further, as shown in the drawing, a crank angle sensor 16 for detecting a crank angle of the internal combustion engine 1, an accelerator opening degree sensor 15 for detecting an opening degree of an accelerator, and various other sensors as well as the airflow meter 5, the pre-catalyst sensor 17, and the post-catalyst sensor 18, which are mentioned above, are electrically connected to the ECU 20 via A/D converters (not shown) and the like. The ECU 20 controls the ignition plug 7, the throttle valve 10, the injectors 12, and the like such that a desired output is obtained, on the basis of detected values and the like of the various sensors, and performs the control of ignition timing, fuel injection amount, fuel injection timing, throttle opening degree, and the like. The throttle opening degree is usually controlled to an opening degree corresponding to an opening degree of the accelerator.

When an air-fuel ratio A/F of exhaust gas flowing into the catalyst 11 is in the vicinity of a stoichiometric air-fuel ratio (e.g., A/F=14.6), the catalyst 11 simultaneously purifies exhaust gas of noxious components contained therein, namely, NOx, HC, and CO. The width (window) of the air-fuel ratio that makes it possible to simultaneously purify exhaust gas of these three components with high efficiency is relatively narrow. In addition, the catalyst 11 also purifies exhaust gas through oxidization (combustion) of hydrogen $H_2$ flowing into exhaust gas to be mixed therewith.

Figure 2:
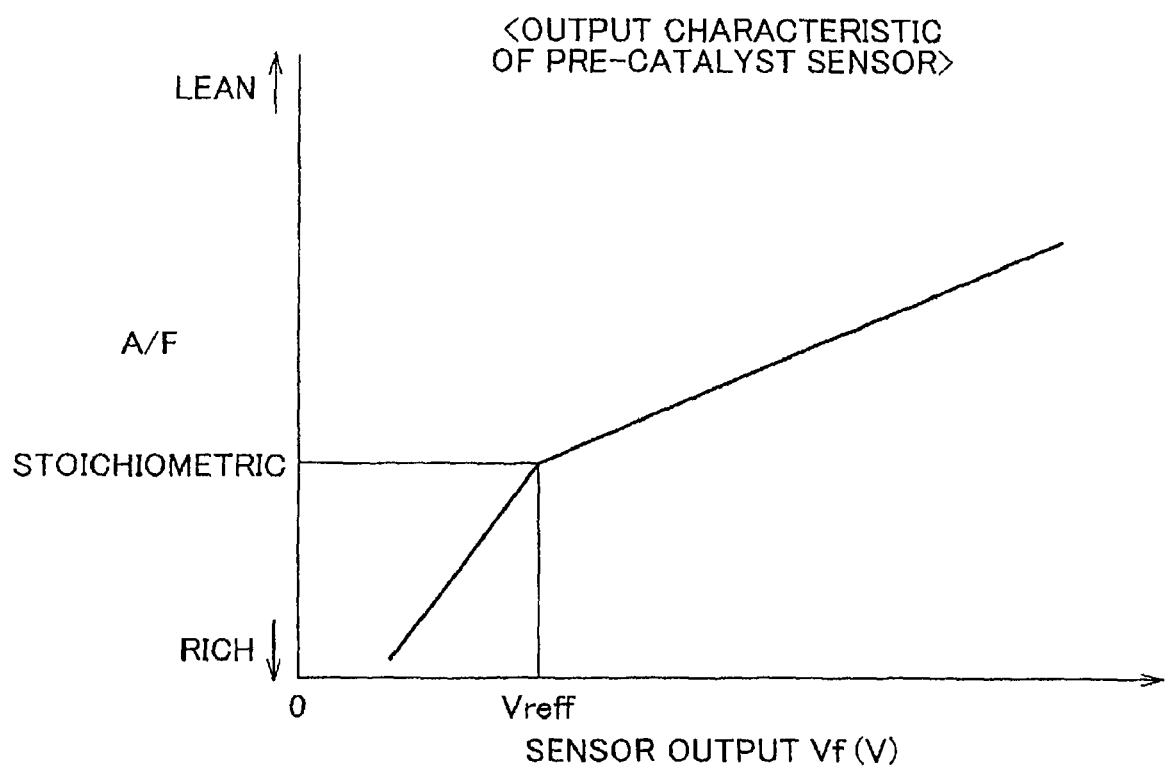
FIG. 2 is a graph representing an output characteristic of a pre-catalyst sensor shown in FIG. 1.

The pre-catalyst sensor 17 is constructed as a so-called wide-range air-fuel ratio sensor, and can continuously detect air-fuel ratios over a relatively wide range. FIG. 2 shows an output characteristic of the pre-catalyst sensor 17. As shown in the drawing, the pre-catalyst sensor 17 outputs a voltage signal Vf whose level is proportional to a detected exhaust gas air-fuel ratio. The output voltage is Vreff (e.g., about 3.3 V) when the exhaust gas air-fuel ratio is stoichiometric. The gradient of an air-fuel ratio-voltage characteristic curve changes at this stoichiometric air-fuel ratio.

Figure 3:
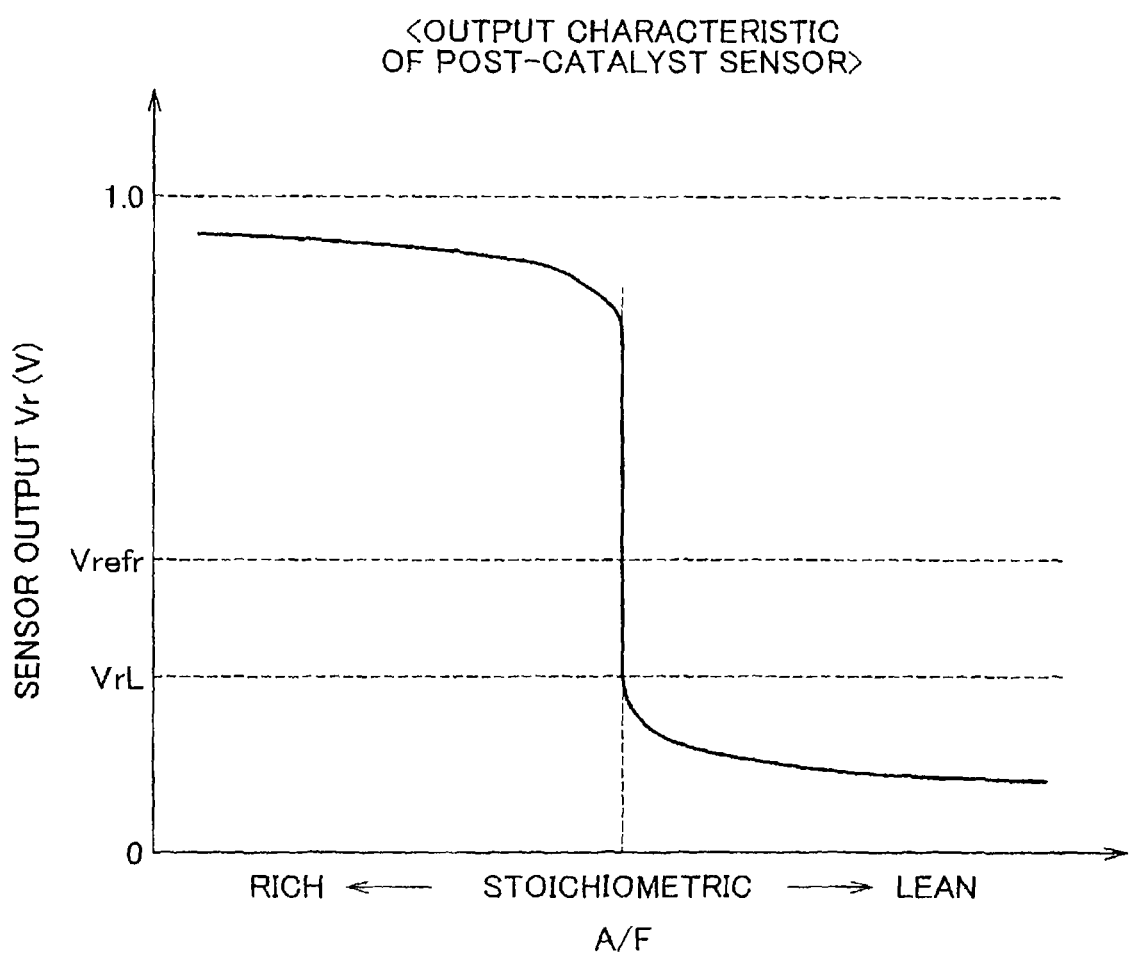
FIG. 3 is a graph representing an output characteristic of a post-catalyst sensor shown in FIG. 1.

On the other hand, the post-catalyst sensor 18 is constructed as a so-called $O_2$ sensor, and has such a characteristic that the output value thereof abruptly changes at the stoichiometric air-fuel ratio. FIG. 3 shows an output characteristic of the post-catalyst sensor 18. As shown in the drawing, an output voltage Vr of the post-catalyst sensor 18 transiently changes at the stoichiometric air-fuel ratio. When the detected exhaust gas air-fuel ratio is leaner than the stoichiometric air-fuel ratio, the output voltage Vr is in the vicinity of a minimum voltage of about 0.1 V. When the detected exhaust gas air-fuel ratio is richer than the stoichiometric air-fuel ratio, the output voltage Vr is in the vicinity of a maximum voltage of about 0.9 V. An approximately intermediate voltage Vrefr=0.45 V between the minimum voltage and the maximum voltage is defined as a stoichiometric equivalent value. When the sensor output voltage is higher than Vrefr, the exhaust gas air-fuel ratio is detected as a value richer than the stoichiometric air-fuel ratio. When the sensor output voltage is lower than Vrefr, the exhaust gas air-fuel ratio is detected as a value leaner than the stoichiometric air-fuel ratio.

When hydrogen is contained in exhaust gas discharged from the combustion chambers 3, the air-fuel ratio of exhaust gas containing hydrogen that has not passed through the catalyst 11, namely, the first exhaust gas air-fuel ratio is detected by the pre-catalyst sensor 17 as the first air-fuel ratio sensor. On the other hand; when this exhaust gas containing hydrogen passes through the catalyst 11, it is purified of hydrogen by the catalyst 11. The air-fuel ratio of exhaust gas purified of hydrogen that has passed through the catalyst 11, namely, the second exhaust gas air-fuel ratio is detected by the post-catalyst sensor 18 as the second air-fuel ratio sensor.

A catalyst is provided in a sensor element of the post-catalyst sensor 18. Exhaust gas can also be purified of hydrogen by this catalyst, namely, a sensor catalyst. Therefore, the sensor catalyst also constitutes part of the catalytic element mentioned in the invention. If exhaust gas is not completely purified of hydrogen by the catalyst 11, this sensor catalyst purifies the exhaust gas of the remaining hydrogen. The air-fuel ratio of exhaust gas purified of hydrogen can be detected by the post-catalyst sensor 18. It is to be noted that the catalyst of the post-catalyst sensor 18 is optional and can be omitted. No sensor catalyst is provided in the pre-catalyst sensor 17.

In this embodiment of the invention, the following air-fuel ratio is performed by the ECU 20 such that the air-fuel ratio of exhaust gas flowing into the catalyst 11 is controlled to a value in the vicinity of the stoichiometric air-fuel ratio. This air-fuel ratio control is composed of main air-fuel ratio control for making the exhaust gas air-fuel ratio detected by the pre-catalyst sensor 17 coincident with a first predetermined target air-fuel ratio and sub air-fuel ratio control for making the exhaust gas air-fuel ratio detected by the post-catalyst sensor 18 coincident with the second target air-fuel ratio. The first target air-fuel ratio and the second target air-fuel ratio are set equal to the stoichiometric air-fuel ratio.

Figure 4:
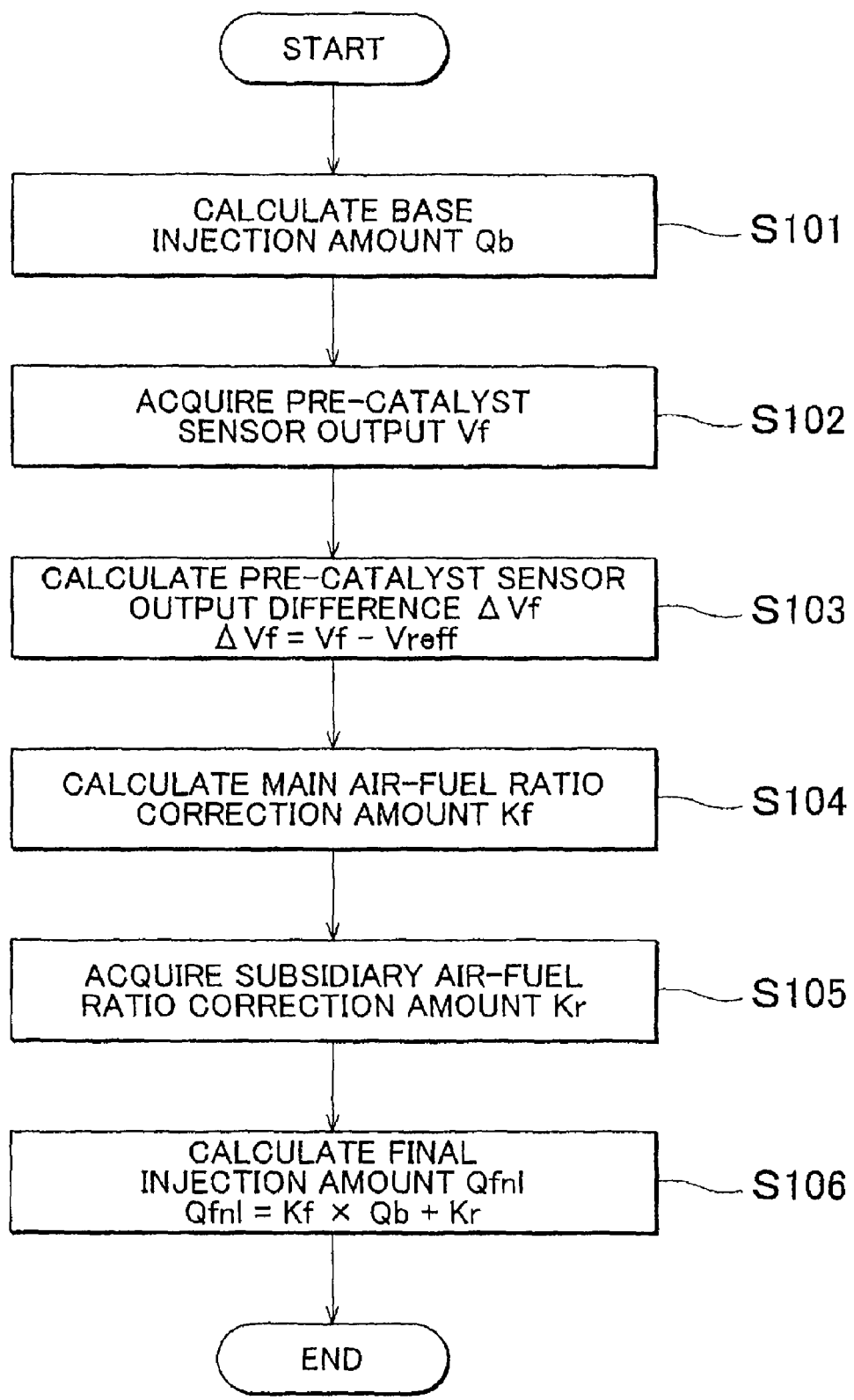
FIG. 4 is a flowchart showing an air-fuel ratio control routine of the internal combustion engine.

FIG. 4 shows an air-fuel ratio control routine. This routine is repeatedly executed by the ECU 20 every time the engine passes through a cycle (a crank angle of 720°) or at predetermined sampling intervals.

First of all in step S101, a base fuel injection amount for making the air-fuel ratio of the mixture in each of the combustion chambers stoichiometric, namely, a base injection amount Qb is calculated. The base injection amount Qb is calculated, for example, on the basis of an intake air amount Ga detected by the airflow meter 5, according to an expression: Qb=Ga/14.6.

In step S102, an output Vf of the pre-catalyst sensor 17 is acquired. In step S103, a difference between this sensor output Vf and a stoichiometric equivalent sensor output Vreff (see FIG. 2), namely, a pre-catalyst sensor output difference $\Delta Vf=Vf-Vreff$ is calculated.

In step S104, a main air-fuel ratio correction amount (correction coefficient) Kf is calculated from a map (which may also be a function, the same will hold true hereinafter) shown in FIG. 5, on the basis of this pre-catalyst sensor output difference $\Delta Vf$. The pre-catalyst sensor output difference $\Delta Vf$ and the main air-fuel ratio correction amount Kf are control amounts for main air-fuel ratio control. For example, given that Pf denotes a gain, there is established an expression: $Kf=Pf \times \Delta Vf$. Then in step S105, a value of a sub air-fuel ratio correction amount Kr set in another routine shown in FIG. 6 is acquired. Finally in step S106, a final injection amount of fuel to be injected from each of the injectors 12, namely, a final injection amount Qfn1 is calculated according to an expression: $Qfn1=Kf \times Qb+Kr$.

Figure 5:
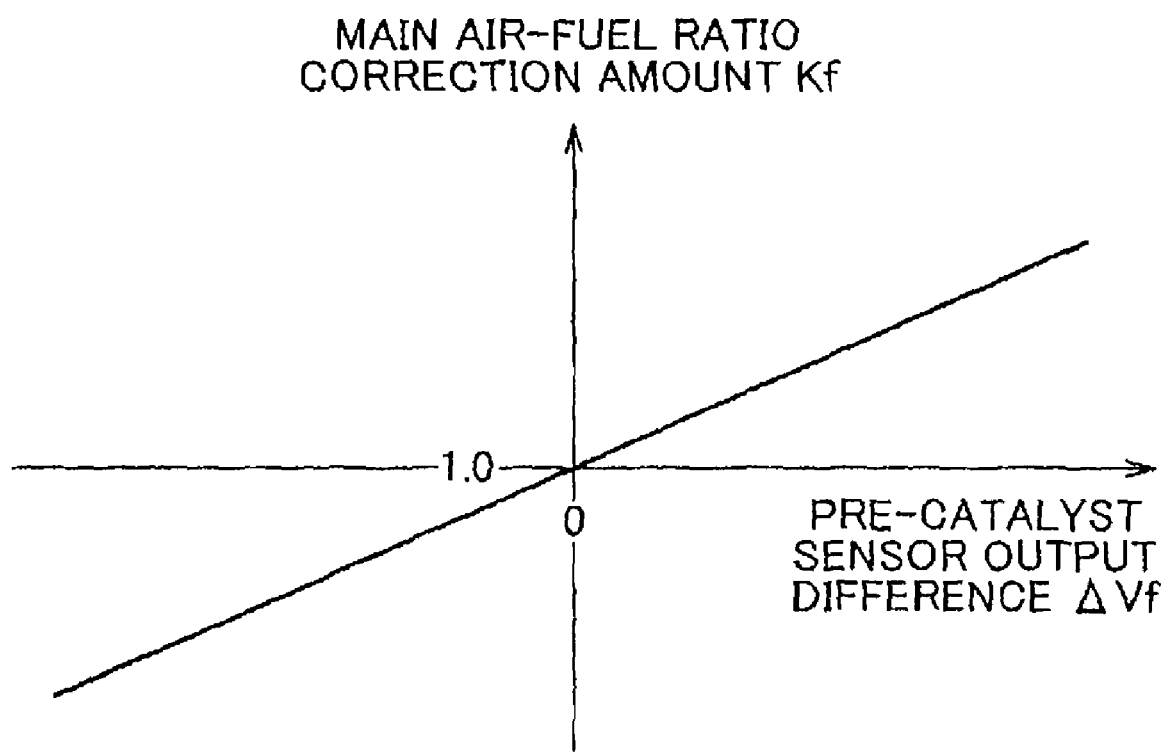
FIG. 5 is a map for calculating a main air-fuel ratio correction amount in the air-fuel ratio control.
Figure 6:
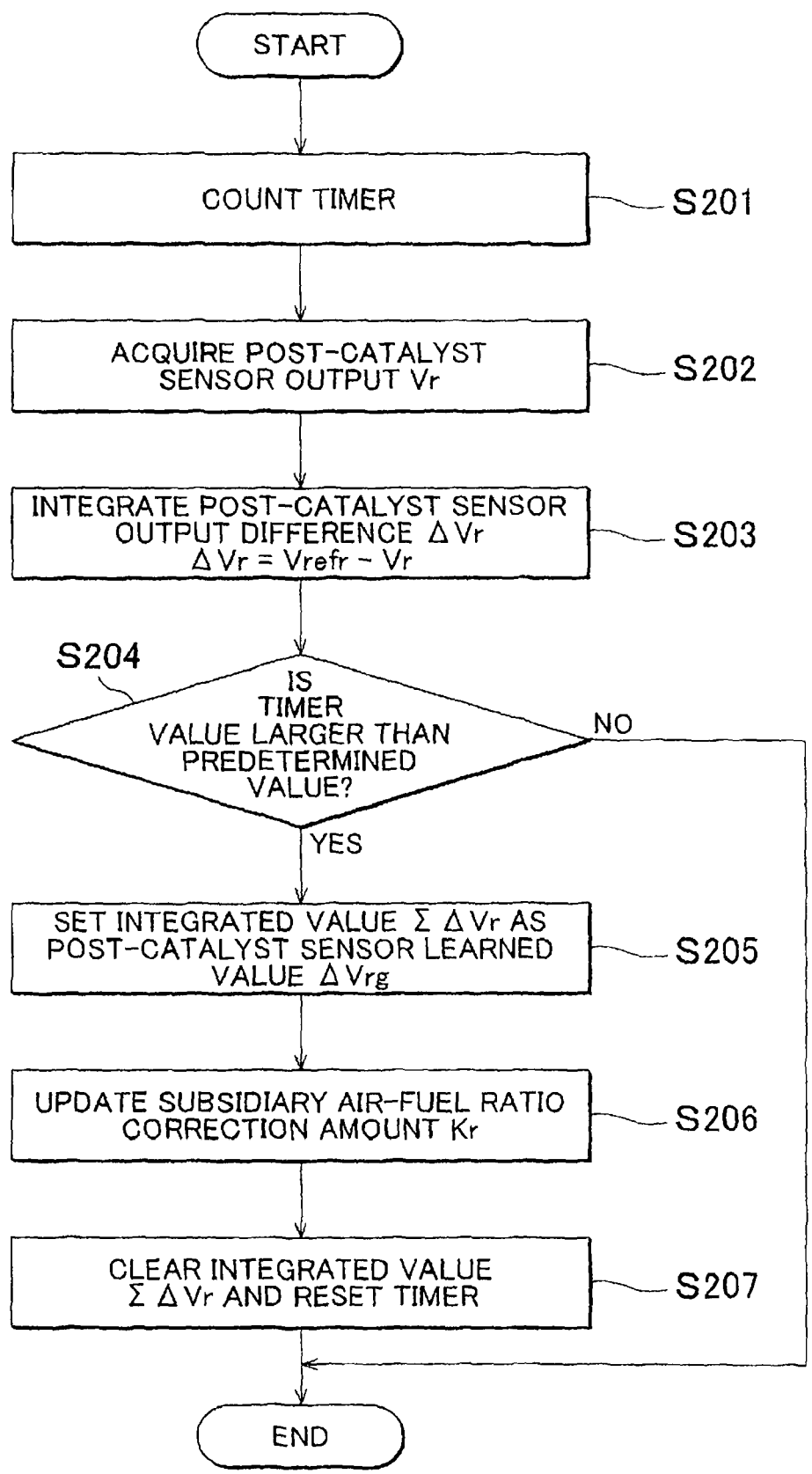
FIG. 6 is a flowchart showing a routine for setting a sub air-fuel ratio correction amount in the air-fuel ratio control.

According to the map of FIG. 5, the more the pre-catalyst sensor output Vf increases from the stoichiometric equivalent sensor output Vreff ($\Delta Vf>0$), namely, the farther the actual pre-catalyst air-fuel ratio shifts away from the stoichiometric air-fuel ratio to the lean side, the more the obtained correction amount Kf increases from 1. As a result, the base injection amount Qb is corrected in an increasing manner. On the contrary, the more the pre-catalyst sensor output Vf decreases from the stoichiometric equivalent sensor output Vreff ($\Delta Vf<0$), namely, the more the actual pre-catalyst air-fuel ratio shifts away from the stoichiometric air-fuel ratio to the rich side, the more the obtained correction amount Kf decreases from 1. As a result, the base injection amount Qb is corrected in a decreasing manner. Thus, main air-fuel ratio feedback control for making the pre-catalyst air-fuel ratio detected by the pre-catalyst sensor 17 coincident with the stoichiometric air-fuel ratio is performed.

The value of the final injection amount Qfn1 obtained in step S106 is uniformly used for all the cylinders. That is, during one engine cycle, fuel is sequentially injected from the injectors 12 of the respective cylinders in an amount equal to the final injection amount Qfn1. In the subsequent engine cycle, fuel is sequentially injected from the injectors 12 of the respective cylinders in a newly calculated final injection amount Qfn1.

As is well known, another correction (coolant temperature correction, battery voltage correction, or the like) can also be added in calculating the final injection amount Qfn1.

FIG. 6 shows a routine for setting a sub air-fuel ratio correction amount. This routine is repeatedly executed by the ECU 20 on a predetermined calculation cycle.

First of all in step S201, the counting of a timer installed in the ECU 20 is carried out. In step S202, an output Vr of the post-catalyst sensor 17 is acquired. In step S203, a difference between this sensor output Vr and a stoichiometric equivalent sensor output Vrefr (see FIG. 3), namely, a post-catalyst sensor output difference $\Delta Vr=Vrefr-Vr$ is calculated. This post-catalyst sensor output difference $\Delta Vr$ is integrated with a last integrated value. FIG. 7 shows the post-catalyst sensor output difference $\Delta Vr$ and how this difference is integrated.

In step S204, it is determined whether or not the timer value has exceeded a predetermined value ts. The routine is terminated unless the predetermined value ts is exceeded.

When the timer value has exceeded the predetermined value ts, a post-catalyst sensor output difference integrated value $\Sigma \Delta Vr$ at this time point is updated and stored as a post-catalyst sensor learned value $\Delta Vrg$. Then in step S206, a sub air-fuel ratio correction amount Kr is calculated from a map shown in FIG. 8, on the basis of this post-catalyst sensor learned value $\Delta Vrg$, and is updated and stored. The post-catalyst sensor learned value $\Delta Vrg$ and the sub air-fuel ratio correction amount Kr are control amounts for sub air-fuel ratio control. For example, given that Pr denotes a gain, the sub air-fuel ratio correction amount Kr is expressed according to an expression: $Kr=Pr \times \Delta Vrg$. Finally in step S207, the post-catalyst sensor output difference integrated value $\Sigma \Delta Vr$ and the timer are reset.

The post-catalyst sensor output difference $\Delta Vr$ is integrated for the predetermined time ts with a view to detecting a time-mean shift amount of the post-catalyst sensor output with respect to the stoichiometric equivalent sensor output Vrefr. The predetermined value ts for prescribing an integration time is a time much longer than one engine cycle. Therefore, the post-catalyst sensor learned value $\Delta Vrg$ and the sub air-fuel ratio correction amount Kr are updated on a cycle much longer than one engine cycle.

Figure 8:
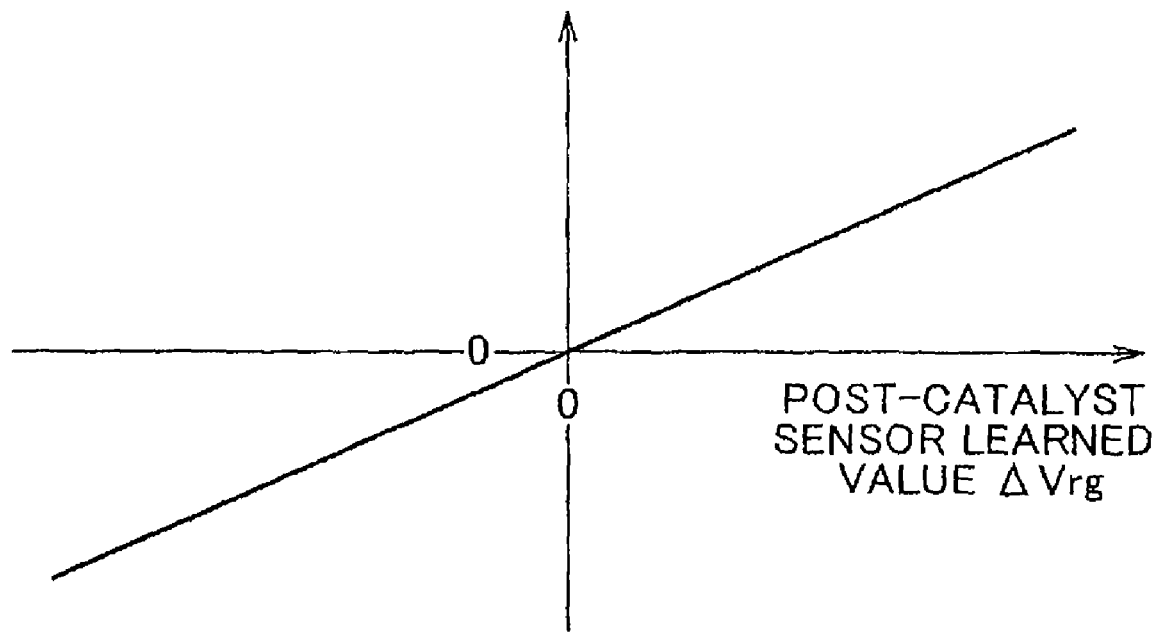
FIG. 8 is a map for calculating the sub air-fuel ratio correction amount.

According to the map of FIG. 8, the more the post-catalyst sensor output Vr decreases on a time-mean basis from the stoichiometric equivalent sensor output Vrefr ($\Delta Vrg>0$), namely, the actual post-catalyst air-fuel ratio shifts away from the stoichiometric air-fuel ratio to the lean side, the more the obtained correction amount Kr increases from 0. As a result, the base injection amount Qb is corrected in an increasing manner in calculating the final injection amount. On the contrary, the more the post-catalyst sensor output Vr increases on a time-mean basis from the stoichiometric equivalent sensor output Vrefr ($\Delta Vrg<0$), namely, the more the actual post-catalyst air-fuel ratio shifts from the stoichiometric air-fuel ratio to the rich side, the more the obtained correction amount Kr decreases from 0. In this manner, sub air-fuel ratio feedback control for making the post-catalyst air-fuel ratio detected by the post-catalyst sensor 18 coincident with the stoichiometric air-fuel ratio is performed. Even when main air-fuel ratio feedback control is performed for reasons of a deterioration in the pre-catalyst sensor 17 and the like, a result thereof may deviate from the stoichiometric air-fuel ratio. Therefore, sub air-fuel ratio feedback control is performed for the purpose of correcting this deviation.

In this example, every time a new learned value $\Delta Vrg$ and a correction amount Kr are calculated, a correction is made with these values themselves. However, the update speed may be slowed down by performing an averaging processing such as smoothing or the like.

Next, detection of an abnormality of inter-cylinder air-fuel ratio dispersion in this embodiment of the invention will be described.

When such an abnormality as influences all the cylinders occurs in a fuel supply system such as the injectors or an air system such as the airflow meter or the like, the absolute value of the feedback correction amount in main air-fuel ratio control is large. By monitoring this absolute value by the ECU, the abnormality can be detected and diagnosed. For example, when the fuel injection amount is deviant from the stoichiometric equivalent amount by 5% on the whole (i.e., when the fuel injection amount is deviant from the stoichiometric equivalent amount by 5% in each of all the cylinders), the feedback correction amount in main air-fuel ratio control is such a value as corrects the deviation of 5%, namely, a correction amount equivalent to −5%. Thus, the deviation of 5% in the fuel supply system or the air system can be detected. Then, when this feedback correction amount becomes equal to or larger than a relatively large predetermined value, it is possible to detect that the fuel supply system or the air system is abnormal on the whole. In this embodiment of the invention as well, the abnormality detector as described above, namely, the abnormality detector based on the main air-fuel ratio correction amount Kf or the pre-catalyst sensor output difference $\Delta Vf$ is provided.

On the other hand, consideration is given to a case where an imbalance occurs among the cylinders instead of an overall deviation in the fuel supply system or the air system. FIG. 9 shows a case where only the air-fuel ratio in one cylinder (the cylinder #1) is deviant from the air-fuel ratios in the other three cylinders (the cylinders #2 to #4) to the rich side. For example, it is assumed that there is an abnormality in the injector of the cylinder #1 and the fuel injection amount in the cylinder #1 is greatly deviant from a stoichiometric equivalent amount by 20%, and on the other hand, that the cylinders #2 to #4 are normal and the fuel injection amount is equal to the stoichiometric equivalent amount. In this case, on the whole, there is a deviation of 20% (20+0+0+0=20). This deviation ought to be the same as when there is a deviation of 5% in each of all the cylinders (5+5+5+5=20).

However, the amount of hydrogen generated from the combustion chambers is larger when the air-fuel ratio in only one of the cylinders is greatly deviant to the rich side than when the air-fuel ratios in all the cylinders are slightly and uniformly deviant to the rich side. The concentration of oxygen in exhaust gas decreases by this increase in the amount of hydrogen. Therefore, the output Vf of the pre-catalyst sensor 17 is more deviant to the rich side when only the air-fuel ratio in one of the cylinders is deviant than when the air-fuel ratios in all the cylinders are uniformly deviant.

Figure 10:
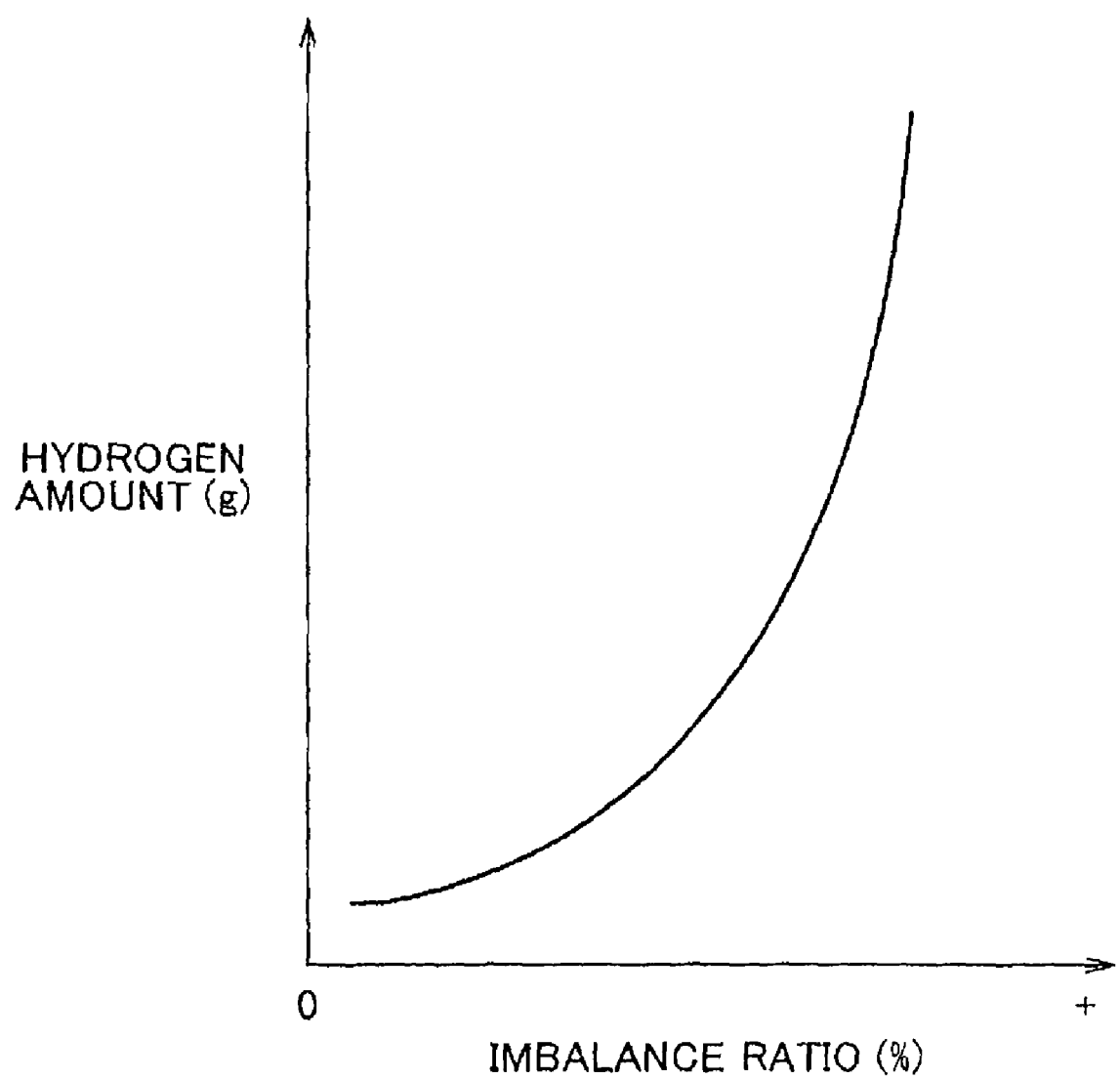
FIG. 10 is a graph showing a relationship between imbalance ratio and generation amount of hydrogen in the first embodiment of the invention.

FIG. 10 shows a relationship between an imbalance ratio (%) in one of the cylinders and an amount (g) of hydrogen generated in the combustion chamber of the cylinder. It should be noted herein that the imbalance ratio (%) is a value indicating how deviant an actual fuel injection amount Q is with respect to a stoichiometric equivalent fuel injection amount Qst. Given that IB denotes the imbalance ratio, there is established an expression: $IB=(Q-Qst)/Qst$. As shown in FIG. 10, the more the imbalance ratio increases, namely, the more the actual fuel injection amount Q increases from the stoichiometric equivalent amount Qst, the more the generation amount of hydrogen increases in the manner of a quadratic function. Therefore, the total generation amount of hydrogen is larger and the output Vf of the pre-catalyst sensor indicates a richer value when only the air-fuel ratio in one of the cylinders is deviant to the rich side by 20% than when the air-fuel ratios in all the cylinders are deviant by 5% respectively.

In spite of the same deviation as a whole, the emission properties of exhaust gas more seriously deteriorate when there is air-fuel ratio dispersion among the cylinders than when the air-fuel ratios in all the cylinders are deviant as a whole. For example, in the latter case, when the air-fuel ratios in all the cylinders are deviant by 5% respectively, the deviation of 5% in all the cylinders can uniformly be eliminated by, for example, making a correction of −5% through main air-fuel ratio feedback control. In the former case, however, when only the air-fuel ratio in one of the cylinders is deviant by 20%, deviations of the cylinders #1, #2, #3, and #4 are 15%, −5%, −5%, and −5% respectively even by making a correction of −5% through main air-fuel ratio feedback control. As a whole, the deviations appear to have been eliminated (15+ (−5)+(−5)+(−5)=0). However, the air-fuel ratio in each of the cylinders is deviant. Thus, the exhaust emission properties in each of the cylinders deteriorates.

On the other hand, in main air-fuel ratio feedback control, a total pre-catalyst air-fuel ratio is detected and controlled to the stoichiometric air-fuel ratio. Therefore, the occurrence of inter-cylinder air-fuel ratio dispersion cannot be detected from the correction amount of main air-fuel ratio feedback control. That is, even in the case where inter-cylinder air-fuel ratio dispersion occurs, the correction amount is zero if the total deviation amount is zero. Apparently, main air-fuel ratio feedback control seems to be normally performed without any problem.

Thus, in this embodiment of the invention, an abnormality of inter-cylinder air-fuel ratio dispersion can be detected as follows, using a characteristic in which the amount of hydrogen is larger and the pre-catalyst sensor output Vf is more deviant to the rich side when there is inter-cylinder air-fuel ratio dispersion than when the air-fuel ratio is deviant as a whole.

When exhaust gas contains hydrogen, the hydrogen in the exhaust gas can be oxidized (burned) to purify the exhaust gas by subjecting the exhaust gas to the action of the catalyst. Then, while the air-fuel ratio of exhaust gas that has not passed through the catalyst and not been purified of hydrogen, namely, the first exhaust gas air-fuel ratio (the pre-catalyst air-fuel ratio) is detected by the first air-fuel ratio sensor (the pre-catalyst sensor 17), the air-fuel ratio of exhaust gas that has passed through the catalyst and been purified of hydrogen, namely, the second exhaust gas air-fuel ratio (the post-catalyst air-fuel ratio) is detected by the second air-fuel ratio sensor (the post-catalyst sensor 18). The detected value of the first exhaust gas air-fuel ratio is deviant to the rich side from the detected value of the second exhaust gas air-fuel ratio due to the influence of hydrogen. To put it the other way around, the detected value of the second exhaust gas air-fuel ratio is deviant to the lean side from the detected value of the first exhaust gas air-fuel ratio due to the influence of hydrogen. Thus, the abnormality of inter-cylinder air-fuel ratio dispersion is detected on the basis of this deviation (shift) to the lean side.

To make it more understandable, the detected value of the second exhaust gas air-fuel ratio of exhaust that has been purified of hydrogen is said to be a true exhaust gas air-fuel ratio, and the detected value of the first exhaust gas air-fuel ratio of exhaust gas that has not been purified of hydrogen is an exhaust gas air-fuel ratio that has apparently deviated to the rich side due to the addition of the value corresponding to hydrogen to the true exhaust gas air-fuel ratio. That is, the first air-fuel ratio sensor is deceived. The more the rich deviation amount in one or some of the cylinders increases, the more the value of hydrogen increases in the manner of a quadratic function. Accordingly, when the detected value of the first exhaust gas air-fuel ratio is greatly deviant from the detected value of the second exhaust gas air-fuel ratio to the rich side, namely, when the detected value of the second exhaust gas air-fuel ratio is greatly deviant from the detected value of the first exhaust gas air-fuel ratio to the lean side, it is considered that there is an abnormality of inter-cylinder air-fuel ratio dispersion.

When an abnormality of inter-cylinder air-fuel ratio dispersion is detected, it is preferable to specify a cylinder causing the abnormality of dispersion (an abnormal cylinder). This is because repair (e.g., the exchange or the like of the injectors) can later be swiftly and appropriately carried out if the abnormal cylinder can be specified. In this embodiment of the invention, therefore, a device for specifying an abnormal cylinder is provided. When an abnormality of inter-cylinder air-fuel ratio dispersion is detected, this abnormal cylinder specifier forcibly reduces the fuel injection amount in each of the cylinders, and detects a state of divergence of the detected value of the second exhaust gas air-fuel ratio from the detected value of the first exhaust gas air-fuel ratio to the lean side at this time. The abnormal cylinder specifier then specifies as an abnormal specifier that one of the cylinders in which the value indicating this state of divergence has become smaller than at the time of detection of the abnormality of inter-cylinder air-fuel ratio dispersion. The principle of the specification of an abnormal cylinder will be described hereinafter in detail.

Figure 11A:
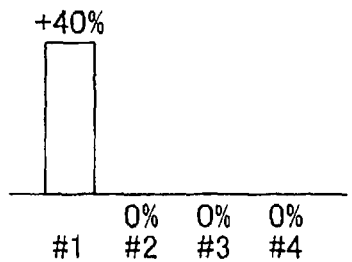
FIGS. 11A to 11F are diagrams for explaining a principle of specifying an abnormal cylinder in the first embodiment of the invention.
Figure 11B:
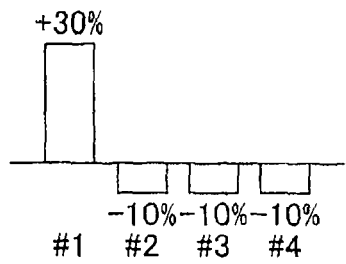

For example, as shown in FIG. 11(A), it is assumed that the cylinder #1 is abnormal and the fuel injection amount in the cylinder #1 is larger than the stoichiometric equivalent amount by 40% (i.e., the imbalance ratio is +40%), the fuel injection amounts in the other cylinders #2, #3, and #4 are stoichiometric equivalent amounts (i.e., the imbalance ratio is 0%). In this case, when main/sub air-fuel ratio control is performed for a certain time, as shown in FIG. 11(B), the imbalance ratio in the cylinder #1 and the imbalance ratios in the other cylinders #2, #3, and #4 then become equal to +30% and −10% respectively such that the fuel injection amount becomes equal to the stoichiometric equivalent amount as a whole. Still, in the cylinder #1, as is apparent from the imbalance ratio of +30%, the fuel injection amount is greatly deviant from the stoichiometric equivalent amount to the rich side, and the generation amount of hydrogen is large as a whole. As a result, the occurrence of an abnormality of inter-cylinder air-fuel ratio dispersion is detected.

Figure 11C:
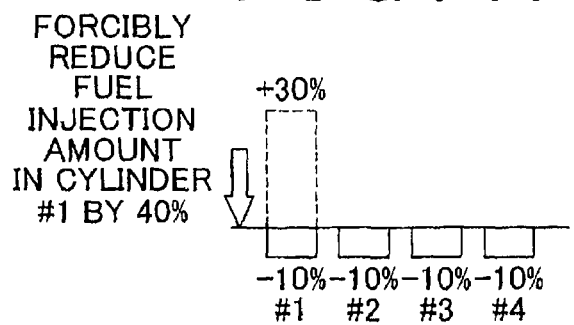

From this state shown in FIG. 11(B), that is, from the state at the time of detection of the abnormality of dispersion, the fuel injection amount in the cylinder #1 is forcibly reduced by 40% as shown in, for example, FIG. 11(C). Thus, the imbalance ratio in the cylinder #1 is −10%, which is equal to the imbalance ratios in the other cylinders #2, #3, and #4.

Figure 11D:
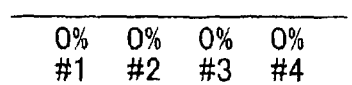

From this state, when main/sub air-fuel ratio control is performed for a certain time while maintaining the reduced state of the fuel injection amount in the cylinder #1, the fuel injection amounts in the respective cylinders are then corrected by +10% as shown in FIG. 11(D). As a result, the fuel injection amounts in the respective cylinders become equal to the stoichiometric equivalent amount (i.e., the imbalance ratios in the respective cylinders are 0%). Then, the generation amount of hydrogen is, as a matter of course, much smaller than at the time of detection of the abnormality of dispersion as shown in FIG. 11(B). In the case where the amount of hydrogen that is generated from all the cylinders when the fuel injection amounts in the respective cylinders are forcibly reduced becomes small, that cylinder can be specified as an abnormal cylinder.

Figure 11E:
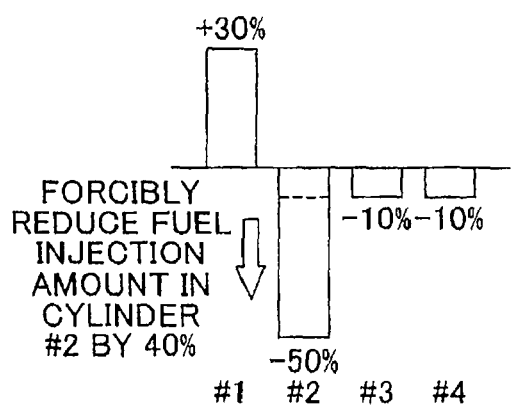

On the other hand, from the state shown in FIG. 11(B), it is assumed that the fuel injection amount in the normal cylinder #2 is forcibly reduced by 40% of the stoichiometric equivalent amount as shown in, for example, FIG. 11(E). Thus, the imbalance ratio in the cylinder #1 remains +30%, the imbalance ratio in the cylinder #2 is −50%, and the imbalance ratios in the cylinders #3 and #4 remain −10%.

Figure 11F:
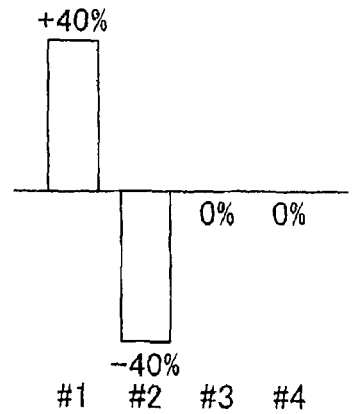

From this state, when main/sub air-fuel ratio control is performed for a certain time while maintaining the reduced state of the fuel injection amount in the cylinder #2, the imbalance ratios in the cylinder #1, the cylinder #2, and the cylinders #3 and #4 soon become equal to +40%, −40%, and 0%, so that the total fuel injection amount becomes equal to the stoichiometric equivalent amount as shown in FIG. 11(F). In particular, the imbalance ratio in the cylinder #1 increases by 10%. As a result, the generation amount of hydrogen becomes larger than in the state shown in FIG. 11(B). Thus, that one of the cylinders in which the generation amount of hydrogen has not decreased when the fuel injection amount is forcibly reduced can be specified not as an abnormal cylinder but as a normal cylinder.

As described above, when the fuel injection amount in each of the cylinders is forcibly reduced and main/sub air-fuel ratio control is performed, there arises a difference in characteristic. That is, the total amount of hydrogen becomes smaller than at the time of detection of the abnormality in the case of an abnormal cylinder, but does not change very much or, on the contrary, becomes larger than at the time of detection of the abnormality of dispersion in the case of a normal cylinder. Thus, using this difference in characteristic, an abnormal cylinder is specified. More specifically, when the fuel injection amount in each of the cylinders is reduced and main/sub air-fuel ratio control is performed, that one of the cylinders in which the value corresponding to the state of divergence of the detected value of the second exhaust gas air-fuel ratio from the detected value of the first exhaust gas air-fuel ratio to the lean side has become smaller than at the time of detection of the abnormality of dispersion is specified as an abnormal cylinder.

The respective embodiments of detection of an abnormality of inter-cylinder air-fuel ratio dispersion according to the aforementioned principle will be described.

First of all, the first embodiment of abnormal detection will be described. As shown in FIGS. 9A to 9C, it is assumed that, for example, an abnormality has occurred only in the injector of the cylinder #1 and the air-fuel ratio in the cylinder #1 is greatly deviant from the air-fuel ratios in the cylinders #2 to #4 to the rich side. In this case, since main air-fuel ratio feedback control is performed, the total air-fuel ratio of exhaust gas after the confluence of exhaust gas in all the cylinders is controlled to a value in the vicinity of the stoichiometric air-fuel ratio as shown in FIG. 9B. That is, the pre-catalyst sensor output Vf is in the vicinity of the stoichiometric equivalent sensor output Vreff. However, the air-fuel ratio in the cylinder #1 is much richer than the stoichiometric air-fuel ratio, and the air-fuel ratios in the cylinders #2 to #4 are leaner than the stoichiometric ratio. The air-fuel ratio is in the vicinity of the stoichiometric air-fuel ratio just as a whole. Besides, a large amount of hydrogen is generated from the cylinder #1. As a result, the output Vf of the pre-catalyst sensor 17 erroneously indicates as the stoichiometric air-fuel ratio the air-fuel ratio that has deviated from a true air-fuel ratio to the rich side.

On the other hand, when exhaust gas containing hydrogen passes through the catalyst 11, it is purified of hydrogen and the influence thereof is eliminated. Accordingly, as shown in FIG. 9C, the output Vr of the post-catalyst sensor 18 indicates a true air-fuel ratio, namely, an air-fuel ratio leaner than the stoichiometric air-fuel ratio. That is, the post-catalyst sensor output Vr is a low value leaner than the stoichiometric equivalent sensor output Vrefr.

From another point of view, it is assumed that, for example, main air-fuel ratio feedback control is performed to make a lean correction of −25 to make the rich deviation of the pre-catalyst air-fuel ratio detected value equal to 0, with a view to correcting a deviation of the pre-catalyst air-fuel ratio detected value by 25 as a whole. However, the 5 out of 25 results not from a genuine deviation of the air-fuel ratio but from the influence of hydrogen. Thus, the main air-fuel ratio feedback control is corrected to the lean side by 5. Accordingly, as a result, the post-catalyst air-fuel ratio is deviant to the lean side by 5.

In this first embodiment of the invention, therefore, although the pre-catalyst air-fuel ratio is controlled to the stoichiometric air-fuel ratio through main air-fuel ratio feedback control, the occurrence of an abnormality of inter-cylinder air-fuel ratio dispersion is detected when a post-catalyst air-fuel ratio leaner than the stoichiometric air-fuel ratio continues to be detected by the post-catalyst sensor 18 for a time equal to or longer than a predetermined time (i.e., when the post-catalyst sensor output is stuck to the lean side). It is considered that this difference in air-fuel ratio across the catalyst has occurred because a remarkably large amount of hydrogen has been generated due to a malfunction in the injector in one of the cylinders or each of some of the cylinders.

When the post-catalyst sensor 18 detects an exhaust gas air-fuel ratio leaner than the stoichiometric air-fuel ratio, a rich correction is made through sub air-fuel ratio feedback control, and the fuel injection amounts in all the cylinders are uniformly increased. Then, the deviation of the detected value of the pre-catalyst air-fuel ratio to the rich side further increases, and the post-catalyst air-fuel ratio is held lean. In this manner, the deviation eventually converges to a main air-fuel ratio correction amount and a sub air-fuel ratio correction amount that correspond to the degree of the abnormality of dispersion.

In the case where a three-way catalyst capable of occluding/discharging oxygen is employed as the catalyst 11, it is preferable for the catalyst to be in the state of having occluded oxygen because its capacity to oxidize hydrogen can be sufficiently exerted. Therefore, in detecting an abnormality, the catalyst may be rendered in advance in the state of occluding oxygen. More specifically, the pre-catalyst air-fuel ratio may be controlled to a value leaner than the stoichiometric air-fuel ratio for a predetermined time.

When the occurrence of an abnormality of inter-cylinder air-fuel ratio dispersion is thus detected, the fuel injection amount in each of the cylinders is forcibly reduced by a predetermined amount during the performance of main/sub air-fuel ratio feedback control, and the output Vf of the pre-catalyst sensor 17 and the output Vr of the post-catalyst sensor 18 after the lapse of a predetermined time from the start of this reduction are acquired. Then, that one of the cylinders in which the acquired output Vr of the post-catalyst sensor 18 has shifted to the rich side from the value at the time of detection of the abnormality of inter-cylinder air-fuel ratio dispersion is specified as an abnormal cylinder.

As shown in FIGS. 9C and 3, the output Vr of the post-catalyst sensor at the time of detection of an abnormality of inter-cylinder air-fuel ratio dispersion is in the vicinity of a minimum value which is lower than a predetermined lean criterial value VrL. It should be noted herein that the lean criterial value VrL is set to a value that is lower than the stoichiometric equivalent value Vrefr and higher than the minimum value of the output of the post-catalyst sensor. Then, in specifying an abnormal cylinder, that one of the cylinders in which the output Vr of the post-catalyst sensor 18 is larger than the lean criterial value VrL is specified as the abnormal cylinder.

FIG. 12 shows an abnormality detection routine according to the first embodiment of the invention. This routine is repeatedly executed by the ECU 20 on a predetermined calculation cycle.

First of all in step S301, it is determined whether or not a precondition for detecting an abnormality is fulfilled. This precondition is, for example, that the engine have been warmed up, that the catalyst 11 have reached an activation temperature, or the like.

When the precondition is not fulfilled, a count value C1 of a lean continuation counter (which will be described later in detail) is cleared in step S310, and the routine is terminated.

On the other hand, when the precondition is fulfilled, it is determined in step S302 whether or not a condition for performing main/sub air-fuel ratio feedback control is fulfilled. This condition is, for example, that the pre-catalyst sensor 17 and the post-catalyst sensor 18 have been activated, and more specifically, that the impedances of the elements of both the sensors, which are detected by the ECU 20, be lower than a predetermined value equivalent to a minimum activation temperature of the sensors.

When the performance condition is not fulfilled, a transition to step S310 is made. On the other hand, when the performance condition is fulfilled, a transition to step S303 is made, and main/sub air-fuel ratio feedback control (stoichiometric F/B control) in which the stoichiometric air-fuel ratio is set as the target air-fuel ratio is performed.

Then in step S304, the output Vr of the post-catalyst sensor 18 is acquired. It is then determined in step S305 whether or not this acquired post-catalyst sensor output Vr is lower than the lean criterial value VrL, namely, whether or not the post-catalyst air-fuel ratio detected by the post-catalyst sensor 18 is leaner than the stoichiometric air-fuel ratio.

When the post-catalyst sensor output Vr is equal to or higher than the lean criterial value VrL, a transition to step S310 is made. On the other hand, when the post-catalyst sensor output Vr is lower than the lean criterial value VrL, the lean continuation counter installed in the ECU 20 is counted up in step S306. The lean continuation counter counts up a time for which the detected value of the post-catalyst air-fuel ratio is leaner than the stoichiometric air-fuel ratio.

It is then determined in step S307 whether or not the count value C1 of the lean continuation counter has reached a predetermined value $C1s$, namely, whether or not the lean continuation time of the detected value of the post-catalyst air-fuel ratio has reached a time equal to or longer than a predetermined time.

When the count value C1 has not reached a value equal to or longer than the predetermined value $C1s$, the routine is terminated. On the other hand, when the counter value C1 has reached a value equal to or longer than the predetermined value $C1s$, it is determined in step S308 that an abnormality of inter-cylinder air-fuel ratio dispersion has occurred. Simultaneously with this determination on the abnormality of inter-cylinder air-fuel ratio dispersion, a warning device such as a check lamp or the like is activated to inform the user of the fact. Further, a diagnosis code corresponding to the abnormality of inter-cylinder air-fuel ratio dispersion is stored into the ECU 20 for the sake of later repair or the like. In this respect, the same will hold true for second to fourth embodiments of the invention and other embodiments of the invention, which will be described later.

After that, an abnormal cylinder is specified in step S309, and the routine is terminated. This specification of the abnormal cylinder is carried out according to a subroutine as shown in FIG. 13.

Figure 13:
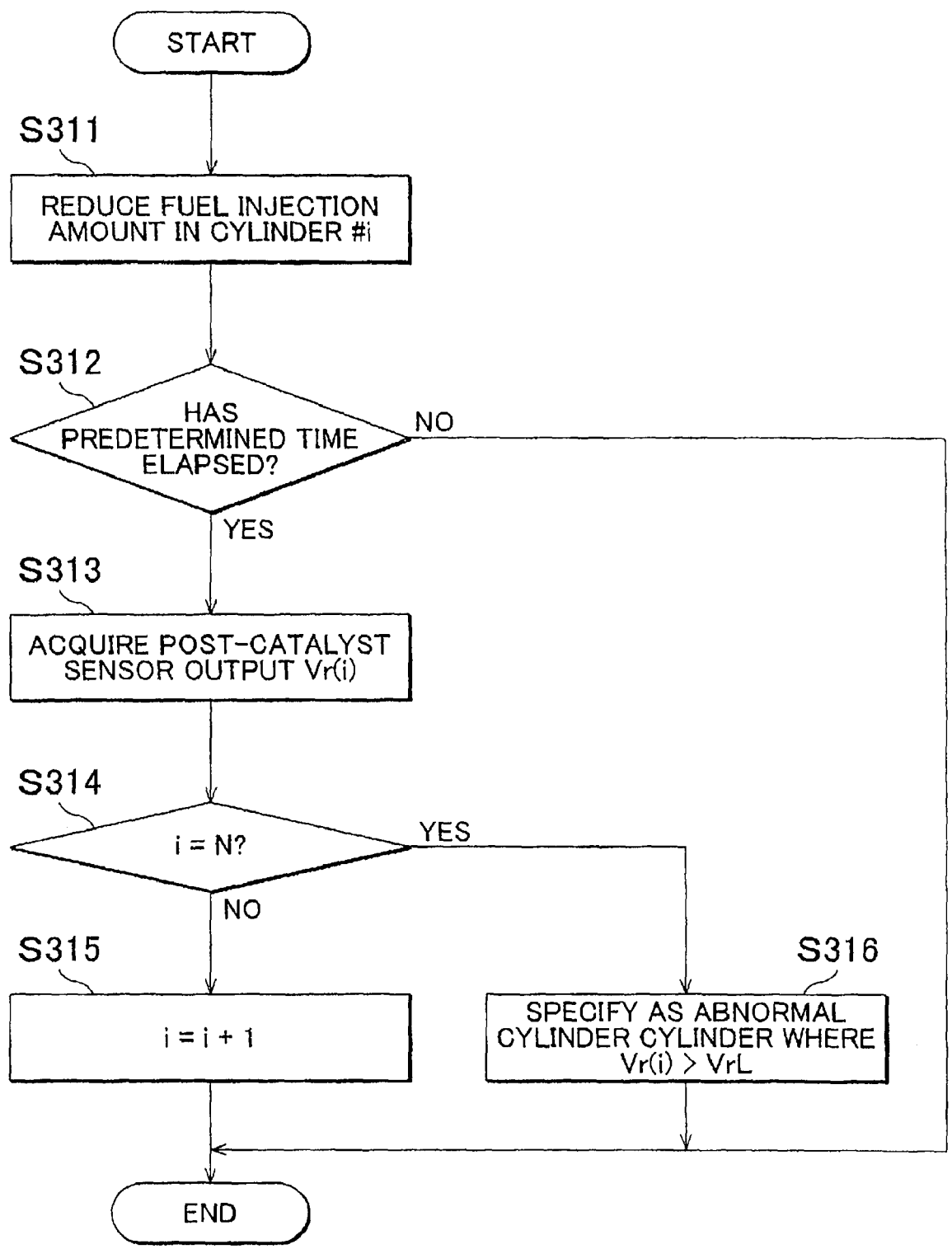
FIG. 13 is a flowchart showing a sub routine of abnormality detection according to the first embodiment of the invention.

The subroutine shown in FIG. 13 is repeatedly executed by the ECU 20 on a predetermined calculation cycle. First of all in step S311, a fuel injection amount Q in a cylinder #i is forcibly reduced by a predetermined amount under the performance of stoichiometric F/B control. It is to be noted herein that i represents a cylinder number (i=1, 2, 3, 4) and that the initial value thereof is 1. For example, the fuel injection amount Q is forcibly reduced by X % (e.g., X=40) of a base injection amount Qb as the stoichiometric equivalent amount. In other words, the value of the base injection amount Qb is replaced with a value $Qb \times (1-X/100)$ obtained by reducing the base injection amount Qb by X %.

It is then determined in step S312 whether or not a predetermined time has elapsed since the start of the reduction of the fuel injection amount in the cylinder #i. The lapse of this predetermined time is awaited, for example, to await a change from a state of FIG. 11C to a state of FIG. 11D, namely, to wait for the fuel injection amount to change from a state at the time of the start of reduction to a corrected state through F/B control. Stoichiometric F/B control is continued for this predetermined time as well. The fuel injection amount for the cylinder #i also continues to be reduced.

When the predetermined time has not elapsed, the routine is terminated. On the other hand, when the predetermined time has elapsed, a transition to step S313 is made to acquire an output value Vr(i) of the post-catalyst sensor 18.

It is then determined in step S314 whether or not the cylinder number i has reached N, which represents the number of cylinders (4 in this embodiment of the invention). When i≠N, namely, i=1, 2, or 3, a transition to step S315 is made to increase the value of i by 1 (i=i+1). The routine is then terminated.

When the subroutine shown in the drawing is thus repeatedly executed, the fuel injection amounts in the first to fourth cylinders are sequentially reduced, and a post-catalyst sensor output value Vr(i) after the lapse of the predetermined time is acquired. When a post-catalyst sensor output value Vr(4) in the fourth cylinder is acquired, a determination result of step S314 is YES, and a transition to step S316 is made.

In step S316, the post-catalyst sensor output value Vr(i) in each of the cylinders is sequentially compared with a predetermined value. In this embodiment of the invention, the predetermined value is the lean criterial value VrL. That one of the cylinders in which Vr(i)>VrL is then detected. This cylinder in which Vr(i)>VrL is specified as an abnormal cylinder. Simultaneously with the specification of this abnormal cylinder, the cylinder number of the abnormal cylinder is stored into the ECU 20 for the sake of later repair or the like. The routine is thus terminated.

Next, the second embodiment of the invention will be described. As described using FIGS. 6 to 8, in sub air-fuel ratio feedback control, the post-catalyst sensor learned value ΔVrg and the sub air-fuel ratio correction amount Kr are learned or updated at intervals of a predetermined time. In this state, when an abnormality of inter-cylinder air-fuel ratio dispersion occurs due to a malfunction of the injector of one of the cylinders or each of some of the cylinders or the like, the post-catalyst sensor output Vr continues to be lean. Therefore, the post-catalyst sensor learned value ΔVrg and the sub air-fuel ratio correction amount Kr are large positive values with which a great deviation to the lean side is returned to the stoichiometric air-fuel ratio.

Figure 14:
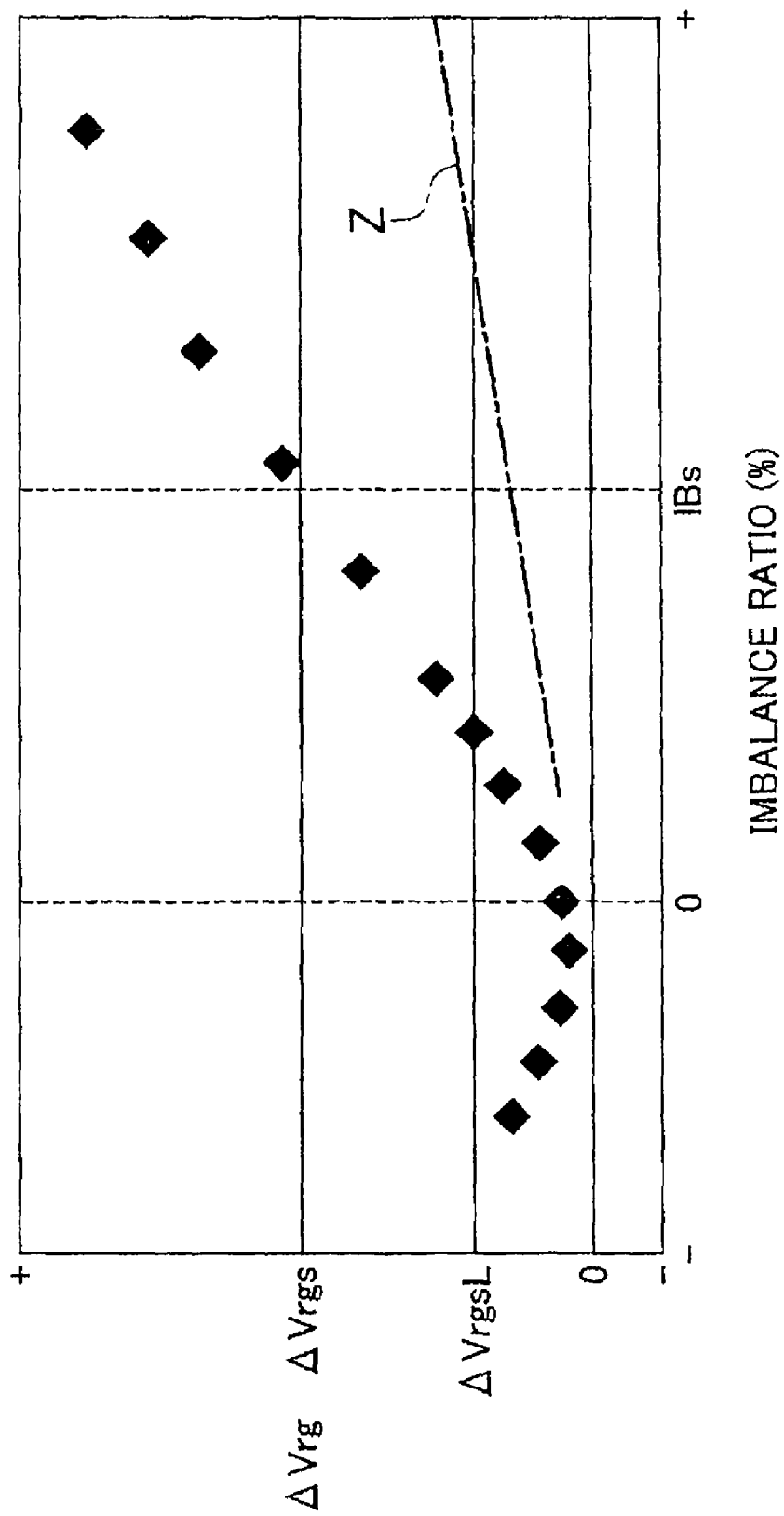
FIG. 14 is a test result obtained by checking a relationship between imbalance ratio and post-catalyst sensor learned value in the first embodiment of the invention.

This is shown in FIG. 14. FIG. 14 is a test result obtained by investigating a relationship between the imbalance ratio (%) and the post-catalyst sensor learned value ΔVrg in one of the cylinders at the time when air-fuel ratio dispersion occurs only in that cylinder. The imbalance ratio is positive in the case of a deviation to the rich side, and negative in the case of a deviation to the lean side. As shown in the drawing, the more the imbalance ratio increases in the direction of the deviation to the rich side, the more the post-catalyst sensor learned value ΔVrg increases. That is, the post-catalyst sensor learned value ΔVrg becomes equal to a positive value with which the air-fuel ratio is further corrected to the rich side.

Thus, in the second embodiment of the invention, when the post-catalyst sensor learned value ΔVrg becomes equal to or larger than a predetermined threshold ΔVrgs, the occurrence of an abnormality of inter-cylinder air-fuel ratio dispersion is detected. Alternatively, when the sub air-fuel ratio correction amount Kr calculated on the basis of the post-catalyst sensor learned value ΔVrg becomes equal to or larger than a predetermined value Krs, the occurrence of an abnormality of inter-cylinder air-fuel ratio dispersion is detected.

Now, as shown in FIG. 14, it is assumed that the imbalance ratio for the threshold ΔVrgs is IBs. This imbalance ratio IBs is a minimum value of the imbalance ratio whose magnitude is unallowably large from the standpoint of emission or the like. Respective rhombic points of FIG. 14 represent the gradient of the post-catalyst sensor learned value ΔVrg when only the air-fuel ratio in one of the cylinders is deviant (i.e., when an imbalance malfunction occurs). When the air-fuel ratios in all the cylinders are uniformly deviant (i.e., when a balance malfunction occurs), the gradient of the post-catalyst sensor learned value ΔVrg is much gentler as indicated by a fictitious line Z. This is because a correction can be uniformly made with ease through main air-fuel ratio control and the influence on the sub air-fuel ratio correction amount is therefore small when all the air-fuel ratios in all the cylinders are deviant. However, the correction amount of main air-fuel ratio control is large when the air-fuel ratios in all the cylinders are greatly deviant. Therefore, another abnormality will be detected prior to the detection of an abnormality of dispersion through the detection of another abnormality which is based on the aforementioned main air-fuel ratio correction amount.

The air-fuel ratio in one of the cylinders or each of some of the cylinders may deviate. In this case, the value of the post-catalyst sensor learned value ΔVrg is as indicated by a negative imbalance ratio range in FIG. 14. The gradient of this range is gentler than the gradient in a positive imbalance ratio range. It should be noted herein that a deviation to the lean side means that the fuel injection amount becomes smaller than a prescribed amount. When a great deviation to the lean side occurs in one of the cylinders, that cylinder usually lapses into misfire. Therefore, an abnormality of dispersion resulting from the deviation to the lean side will first be detected by another misfire detector. The contents of detection of an abnormality of dispersion in this embodiment of the invention are particularly advantageous for an abnormality of a deviation to the rich side.

Figure 15:
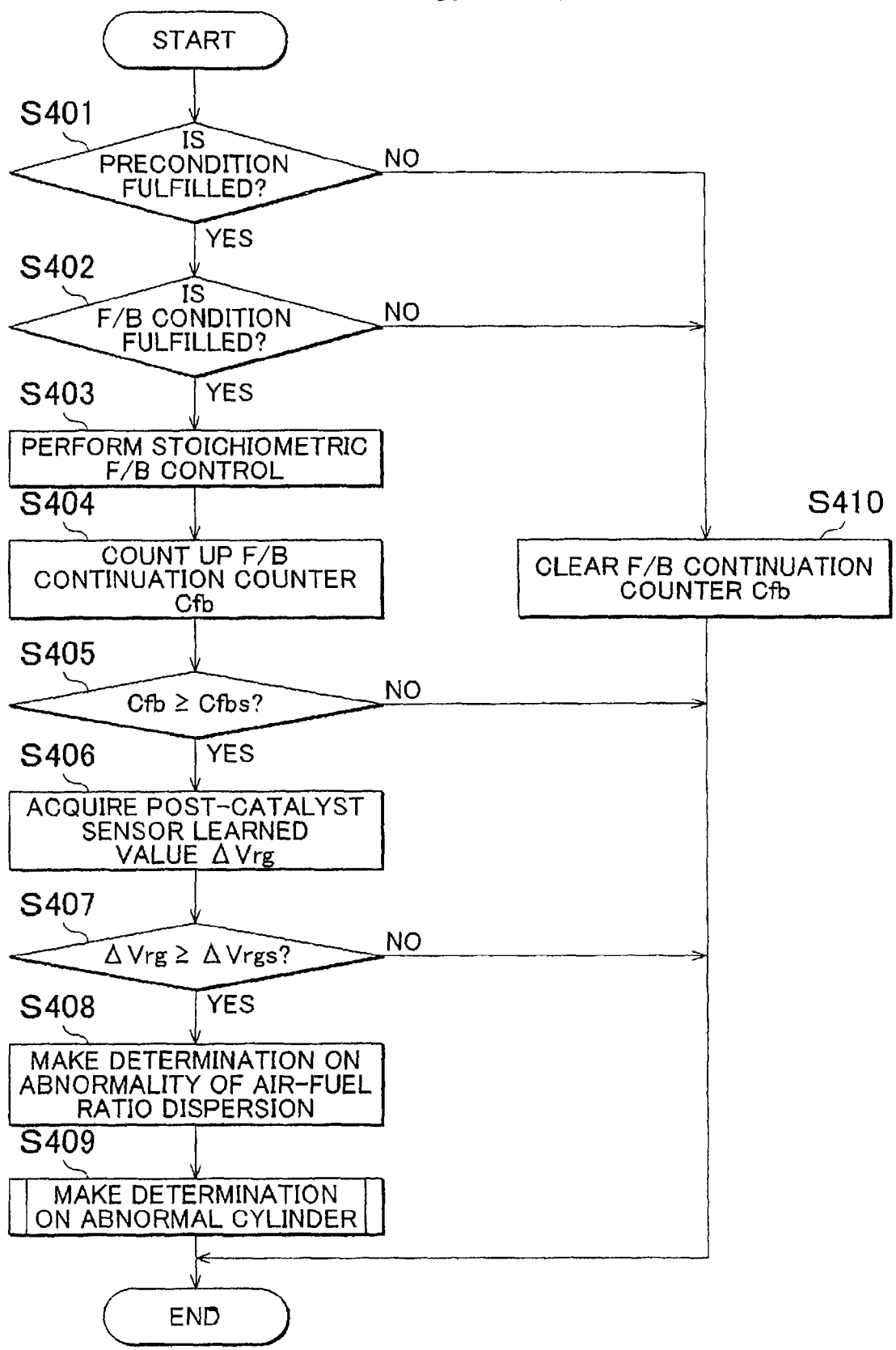
FIG. 15 is a flowchart showing a routine of abnormality detection according to the second embodiment of the invention.

FIG. 15 shows an abnormality detection routine according to the second embodiment of the invention. This routine is repeatedly executed by the ECU 20 on a predetermined calculation cycle.

First of all in step S401, as is the case with the aforementioned step S301, it is determined whether or not the precondition for abnormality detection is fulfilled. When the precondition is not fulfilled, a counter value Cfb of a feedback continuation counter (which will be described later in detail) in step S410.

On the other hand, when the precondition is fulfilled, as is the case with the aforementioned step S302, it is determined in step S402 whether or not a condition for performing main/sub air-fuel ratio feedback control is fulfilled. When the performance condition is not fulfilled, the counter value Cfb of the feedback continuation counter is cleared in step S410, and the routine is terminated.

On the other hand, when the performance condition is fulfilled, a transition to step S403 is made, and stoichiometric feedback control is performed as is the case with the aforementioned step S303.

Then in step S404, the feedback continuation counter installed in the ECU 20 is counted up. The feedback continuation counter counts a continuation time of stoichiometric feedback control. This time measurement is carried out to wait for the post-catalyst sensor learned value ΔVrg and the sub air-fuel ratio correction amount Kr to be updated and converge to a value corresponding to a state of air-fuel ratio dispersion.

Then in step S405, it is determined whether or not the count value C of the feedback continuation counter has reached a value equal to or larger than a predetermined value Cfbs, namely, a time sufficient for the post-catalyst sensor learned value ΔVrg and the sub air-fuel ratio correction amount Kr to be updated to a value corresponding to the state of air-fuel ratio dispersion has elapsed.

When the count value Cfb has not reached a value equal to or larger than the predetermined value Cfbs, the routine is terminated. On the other hand, when the count value Cfb has become equal to or larger than the predetermined value Cfbs, a value of the post-catalyst sensor learned value ΔVrg at that time point is acquired in step S406.

Then in step S407, it is determined whether or not this acquired post-catalyst sensor learned value ΔVrg is equal to or larger than a predetermined threshold ΔVrgs.

When the post-catalyst sensor learned value ΔVrg has not reached a value equal to or larger than the threshold ΔVrgs, the routine is terminated. On the other hand, when the post-catalyst sensor learned value ΔVrg has become equal to or larger than the threshold ΔVrgs, it is determined in step S408 that an abnormality of inter-cylinder air-fuel ratio dispersion has occurred. An abnormal cylinder is specified in step S409, and the routine is terminated. Specification of the abnormal cylinder in step S409 is carried out according to a subroutine shown in FIG. 16.

An abnormality of inter-cylinder air-fuel ratio dispersion is detected here through a comparison with a predetermined value of the post-catalyst sensor learned value ΔVrg. As a matter of course, however, an abnormality of inter-cylinder air-fuel ratio dispersion may be detected through a comparison with a predetermined value of the sub air-fuel ratio correction amount Kr.

Figure 16:
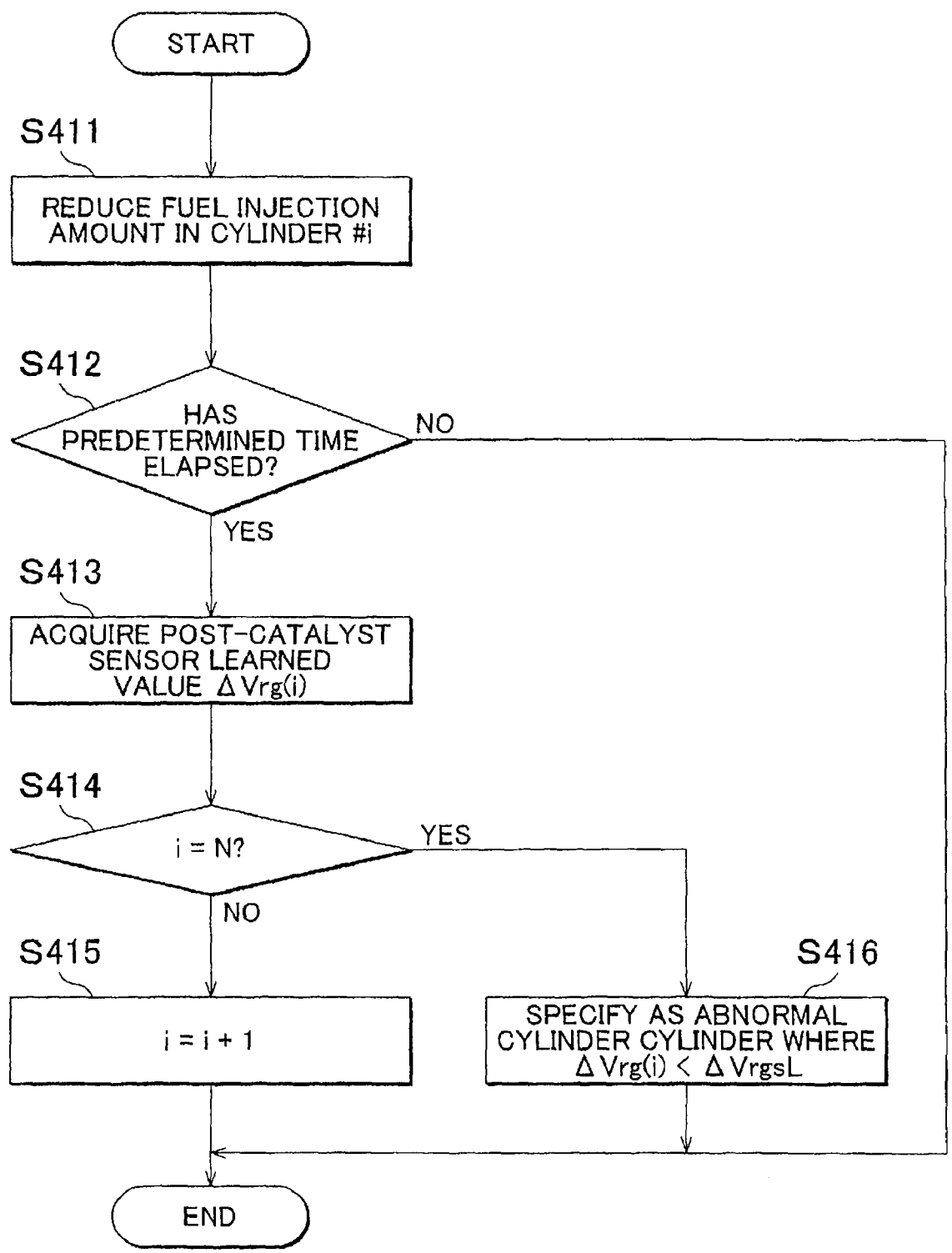
FIG. 16 is a flowchart showing a sub routine of abnormality detection according to the second embodiment of the invention.

A sub routine for specifying an abnormal cylinder, which is shown in FIG. 16, will be described. This sub routine is repeatedly executed by the ECU 20 on a predetermined calculation cycle.

First of all in step S411, as is the case with the aforementioned step S311, the fuel injection amount Q in the cylinder #i is forcibly reduced by a predetermined amount. Then in step S412, as is the case with the aforementioned step S312, it is determined whether or not a predetermined time has elapsed since the start of the reduction of the fuel injection amount in the cylinder #i. When the predetermined time has not elapsed, the routine is terminated. On the other hand, when the predetermined time has elapsed, a transition to step S413 is made to acquire the post-catalyst sensor learned value ΔVrg(i).

Then in step S414, as is the case with the aforementioned step S314, it is determined whether or not the cylinder number i has reached the predetermined value N. When i≠N, a transition to step S415 is made to increase the value i by 1 (i=i+1), and the routine is terminated.

When the sub routine shown in the drawing is thus repeatedly executed, the fuel injection amounts in the first to fourth cylinders are sequentially reduced, and the post-catalyst sensor learned value ΔVrg(i) after the lapse of the predetermined time is acquired. Then, when the post-catalyst sensor learned value ΔVrg(4) in the fourth cylinder is acquired, a result of determination in step S414 is YES, and a transition to step S416 is made.

In step S416, the post-catalyst sensor learned values ΔVrg (i) in the respective cylinders are sequentially compared with a predetermined value. In this embodiment of the invention, the predetermined value is a positive value ΔVrgsL which is smaller than the threshold ΔVrgs. Then, that one of the cylinders in which ΔVrg(i)<ΔVrgsL is searched. The cylinder in which ΔVrg(i)<ΔVrgsL is specified as an abnormal cylinder. Simultaneously with the specification of this abnormal cylinder, the cylinder number of that abnormal cylinder is stored into the ECU 20 for the sake of later repair or the like. The routine is thus terminated.

Next, the third embodiment of the invention will be described. As described in the first embodiment of the invention, in the case where there is an abnormality of air-fuel ratio dispersion, the post-catalyst air-fuel ratio is lean due to the influence of hydrogen even when the pre-catalyst air-fuel ratio is controlled to the stoichiometric air-fuel ratio. On the other hand, extending this phenomenon, the post-catalyst air-fuel ratio may be lean even when the pre-catalyst air-fuel ratio is forcibly controlled to a value richer than the stoichiometric air-fuel ratio.

Thus, in this third embodiment of the invention, as shown in FIGS. 17A to 17C, the target air-fuel ratio in main air-fuel ratio feedback control is forcibly set to a value (e.g., 14.1 or the like) richer than the stoichiometric air-fuel ratio as a reference value, and main air-fuel ratio feedback control is performed as forcible rich feedback control. Then, in addition, when the post-catalyst sensor 18 detects an exhaust gas air-fuel ratio leaner than the stoichiometric for a time equal to or longer than a predetermined time, it is determined that an abnormality of inter-cylinder air-fuel ratio dispersion has occurred. The target air-fuel ratio in sub air-fuel ratio feedback control remains stoichiometric.

Figure 18:
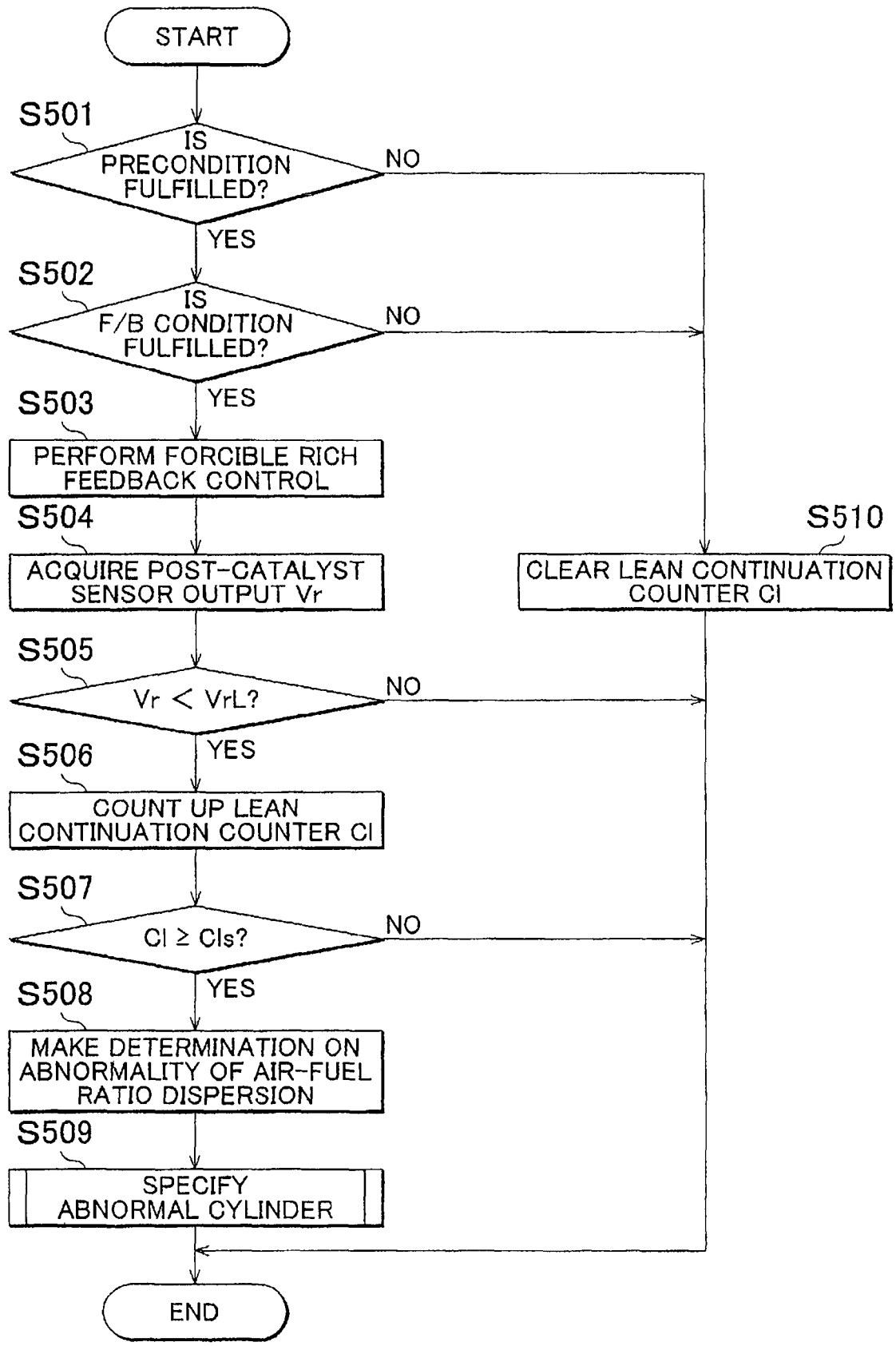
FIG. 18 is a flowchart showing a routine of abnormality detection according to the third embodiment of the invention.

FIG. 18 shows an abnormality detection routine according to the third embodiment of the invention. This routine is substantially the same as the routine according to the first embodiment of the invention, which is shown in FIG. 12. The routine according to the third embodiment of the invention is different from the routine according to the first embodiment of the invention only in that forcible rich feedback control is performed instead of stoichiometric feedback control as to main air-fuel ratio feedback control. The sub routine shown in FIG. 13 is appropriate also as a sub routine for specifying an abnormal cylinder in step S509. However, main air-fuel ratio feedback control performed during the execution of the sub routine is forcible rich feedback control.

As a modification example, it is also appropriate to acquire a sub air-fuel ratio control amount as in the second embodiment of the invention after having performed forcible rich feedback control, and detect an abnormality of dispersion on the basis of this value.

Next, the fourth embodiment of the invention will be described. In the foregoing first to third embodiments of the invention, an abnormality of inter-cylinder air-fuel ratio dispersion is detected on the basis of a state of diversion of the post-catalyst air-fuel ratio detected by the post-catalyst sensor 18 from the pre-catalyst air-fuel ratio detected by the pre-catalyst sensor 17 to the lean side. On the other hand, in the fourth embodiment of the invention, a pre-catalyst air-fuel ratio detected by a catalyst-equipped pre-catalyst sensor is used instead of the post-catalyst air-fuel ratio detected by the post-catalyst sensor 18.

A construction according to this fourth embodiment of the invention is shown in FIGS. 19A and 19B. This construction is identical to that of FIG. 1 except in the part shown in the drawing. A catalyst-equipped pre-catalyst sensor 30 is installed in the exhaust passage upstream of the catalyst 11, especially at a position immediately before the catalyst 11. The catalyst-equipped pre-catalyst sensor 30 is installed substantially at the same position as the pre-catalyst sensor 17. The catalyst-equipped pre-catalyst sensor 30 is obtained by providing a catalytic layer on a sensor element of an air-fuel ratio sensor that is identical in construction to the pre-catalyst sensor 17.

The catalytic layer of the catalyst-equipped pre-catalyst sensor 30 also oxidizes and burns hydrogen contained in exhaust gas, and purifies the exhaust gas of hydrogen. Therefore, the air-fuel ratio of exhaust gas that has been purified of hydrogen by the catalytic layer is detected by the catalyst-equipped pre-catalyst sensor 30.

Figure 20:
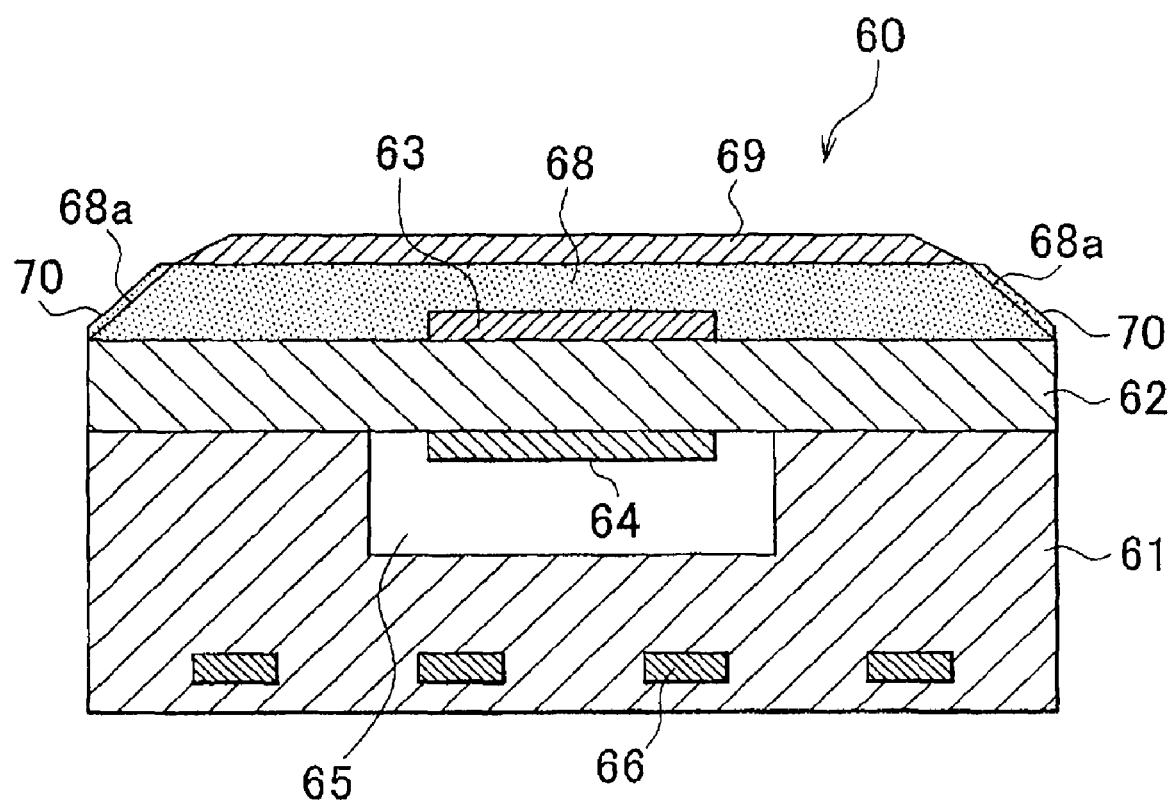
FIG. 20 is a sectional view of a sensor element of a catalyst-equipped pre-catalyst sensor according to the fourth embodiment of the invention.

FIG. 20 shows a cross-section of a sensor element of the catalyst-equipped pre-catalyst sensor 30. A sensor element 60 is equipped with an insulating layer 61, a plate-like solid electrolyte 62 firmly fixed to the insulating layer 61, and a pair of electrodes 63 and 64 installed on a front face of this solid electrolyte 62 and a back face of this solid electrolyte 62 respectively in such a manner as to face each other. For example, the insulating layer 61 is made of highly thermal conductive ceramics such as alumina or the like, and the solid electrolyte 62 is made of a sheet of partial stabilization zirconia. The electrodes 63 and 64 are made of platinum. An atmospheric chamber 65 is formed in that region of the insulating layer 61 which faces the inner electrode 64, and the electrode 64 is exposed to the atmosphere. A heater 66 is embedded in the insulating layer 61. A diffused resistor layer 68 made of, for example, porous ceramics is laminated on the exhaust-side electrode 63 and the solid electrolyte 62, and a shielding layer 69 is laminated on the diffused resistor layer 68. Exhaust gas of element atmosphere enters the diffused resistor layer 68 from an inlet face 68a of the diffused resistor layer 68, is diffused inside the diffused resistor layer 68, and reaches the exhaust-side electrode 63. At this time, a limiting current corresponding to the concentration of oxygen in the gas that has reached the exhaust-side electrode 63 flows between the electrodes 63 and 64, and a sensor output is structured on the basis of this limiting current.

The catalyst-equipped pre-catalyst sensor 30 is obtained by providing a catalytic layer 70 on the inlet face 68a of the diffused resistor layer 68. This catalytic layer 70 purifies exhaust gas of hydrogen, and the gas removed of hydrogen is detected by the exhaust-side electrode 63. As is the case with the catalyst 11, the catalytic layer 70 includes a noble metal (Pt or the like) constituting an active site, and can purify exhaust gas of other noxious components contained therein (NOx, HC, CO) as well as hydrogen. The catalytic layer 70 does not hinder the flow of gas. The pre-catalyst sensor 17 is constructed by removing the catalytic layer 70 from this catalyst-equipped pre-catalyst sensor 30.

As shown in FIG. 19A, when there is an abnormality of inter-cylinder air-fuel ratio dispersion, the output Vfc of the catalyst-equipped pre-catalyst sensor 30 is more deviant to the lean side than the output Vf of the pre-catalyst sensor 17. Accordingly, an abnormality of inter-cylinder air-fuel ratio dispersion can be detected by monitoring a difference between these outputs. FIG. 19A shows an example in which main air-fuel ratio control based on the pre-catalyst sensor output Vf is not performed, and the pre-catalyst air-fuel ratio is not controlled to a value equivalent to the stoichiometric air-fuel ratio. However, the outputs of both the sensors deviate in the same manner even when main air-fuel ratio control based on the pre-catalyst sensor output Vf is performed.

Figure 21:
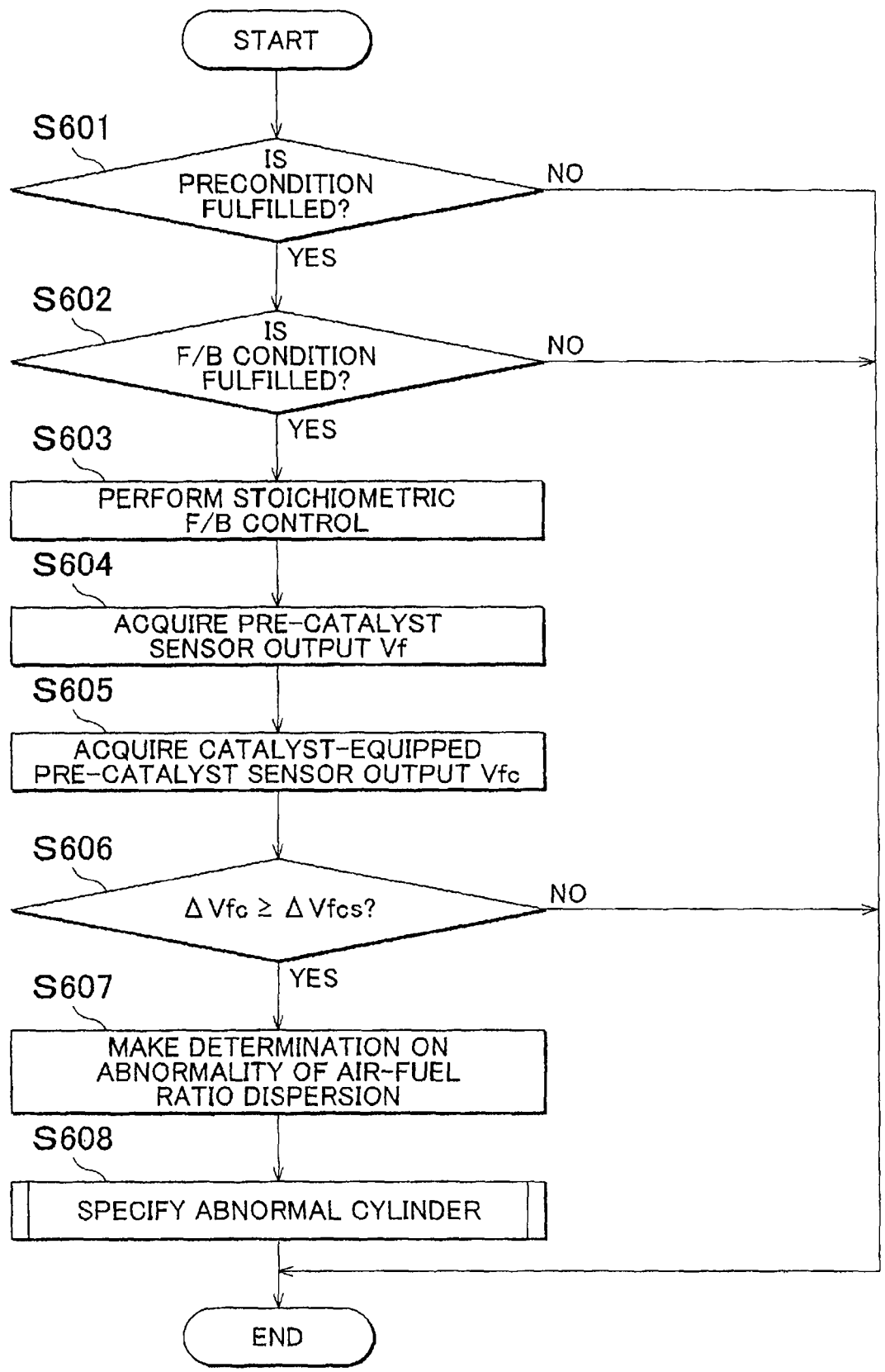
FIG. 21 is a flowchart showing a routine of abnormality detection according to the fourth embodiment of the invention.

FIG. 21 shows an abnormality detection routine according to the fourth embodiment of the invention. Steps S601 to S603 are identical to the aforementioned steps S301 to S303 respectively. It should be noted herein that stoichiometric feedback control is performed to make the condition of air-fuel ratio constant and hence enhance the accuracy of detection.

Then in step S604, the pre-catalyst sensor output Vf is acquired, and the catalyst-equipped pre-catalyst sensor output Vfc is acquired in step S605.

After that, in step S606, a difference $\Delta Vfc = Vfc - Vf$ between these sensor outputs is calculated, and it is determined whether or not this difference $\Delta Vfc$ is equal to or larger than a predetermined value $\Delta Vfcs$. When the difference is not equal to or larger than the predetermined value $\Delta Vfcs$, the routine is terminated. On the other hand, when the difference $\Delta Vfcs$ has reached a value equal to or larger than the predetermined value $\Delta Vfcs$, it is determined in step S607 that an abnormality of inter-cylinder air-fuel ratio dispersion has occurred. After that, an abnormal cylinder is specified in step S608, and the routine is terminated.

Figure 22:
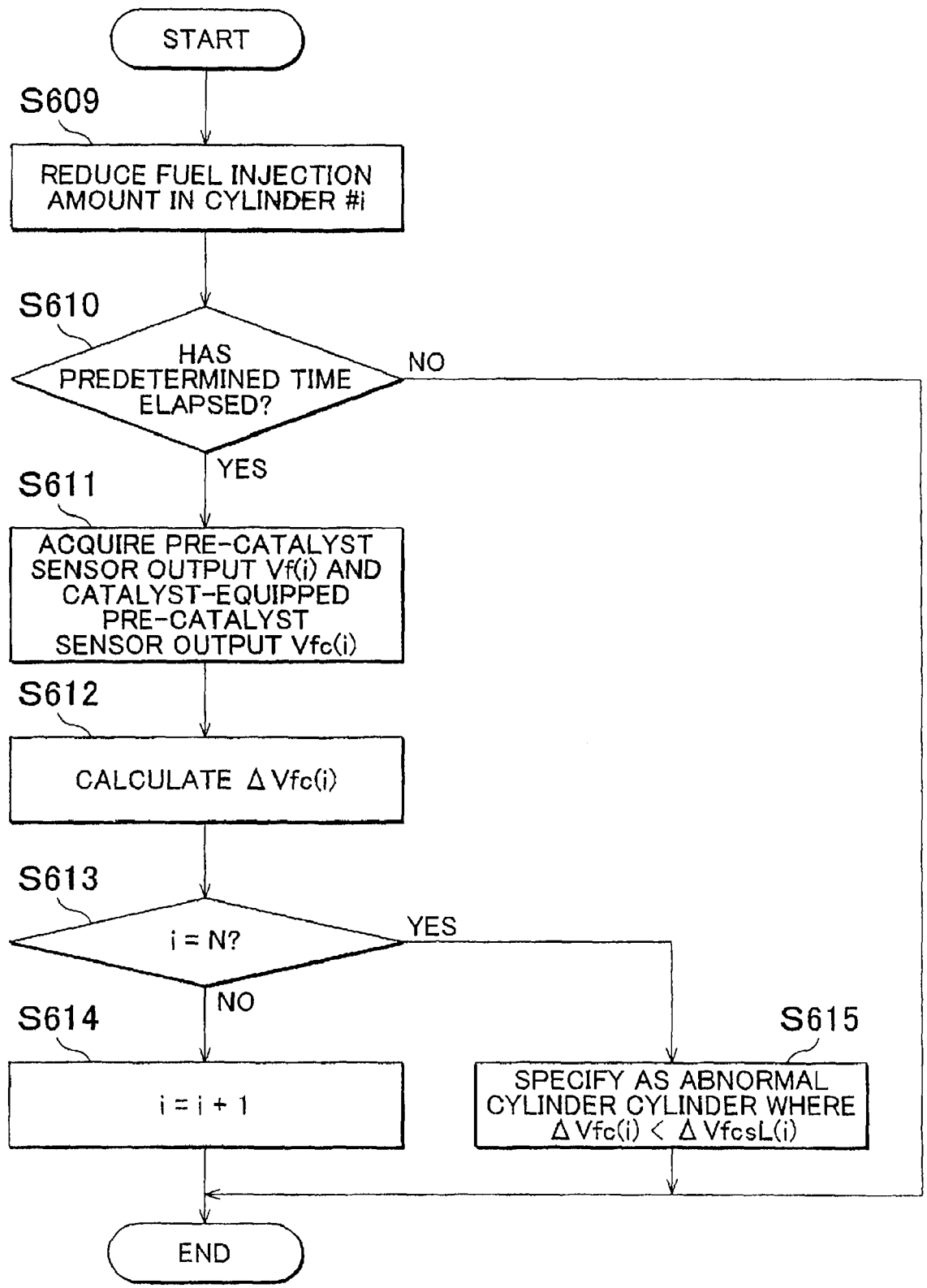
FIG. 22 is a flowchart showing a sub routine of abnormality detection according to the fourth embodiment of the invention.

A sub routine executed in step S608 to specify an abnormal cylinder will be described using FIG. 22. This sub routine is repeatedly executed by the ECU 20 on a predetermined calculation cycle.

First of all in step S609, as is the case with the aforementioned step S311, the fuel injection amount Q in the cylinder #i is forcibly reduced by a predetermined amount. Then in step S610, as is the case with the aforementioned step S312, it is determined whether or not a predetermined time has elapsed since the start of the reduction of the fuel injection amount in the cylinder #i. When the predetermined time has not elapsed, the routine is terminated. On the other hand, when the predetermined time has elapsed, a transition to step S611 is made to acquire the pre-catalyst sensor output Vf(i) and the catalyst-equipped pre-catalyst sensor output Vfc(i). Then in step S612, a difference $\Delta Vfc(i) = Vfc(i) - Vf(i)$ between these sensor outputs is calculated.

Then in step S613, as is the case with the aforementioned step S314, it is determined whether or not the cylinder number i has reached the predetermined value N. When i≠N, a transition to step S614 is made to increase the value i by 1 (i=i+1), and the routine is terminated.

When the sub routine shown in the drawing is thus repeatedly executed, the fuel injection amounts in the first to fourth cylinders are sequentially reduced, and the difference $\Delta Vfc(i)$ between the sensor outputs after the lapse of the predetermined time is acquired. Then, when a sensor output difference $\Delta Vfc(4)$ in the fourth cylinder is acquired, a result of the determination in step S613 is YES, and a transition to step S615 is made.

In step S615, the sensor output differences $\Delta Vfc(i)$ in the respective cylinders are sequentially compared with a predetermined value. In this embodiment of the invention, the predetermined value is a positive value $\Delta VfcsL$ which is smaller than the aforementioned predetermined value $\Delta Vfcs$. Then, that one of the cylinders in which $\Delta Vfc(i) < \Delta VfcsL$ is then searched. The cylinder in which $\Delta Vfc(i) < \Delta VfcsL$ is specified as an abnormal cylinder. Simultaneously with the specification of this abnormal cylinder, the cylinder number of the abnormal cylinder is stored into the ECU 20 for the sake of later repair or the like. Thus, the routine is terminated.

Next, an additional embodiment of the invention will be described. The construction of this additional embodiment of the invention is substantially identical to the construction of the foregoing embodiment of the invention shown in FIG. 1, and like reference symbols are used to represent like elements. The following description will center on the difference between these embodiments of the invention.

Figure 23:
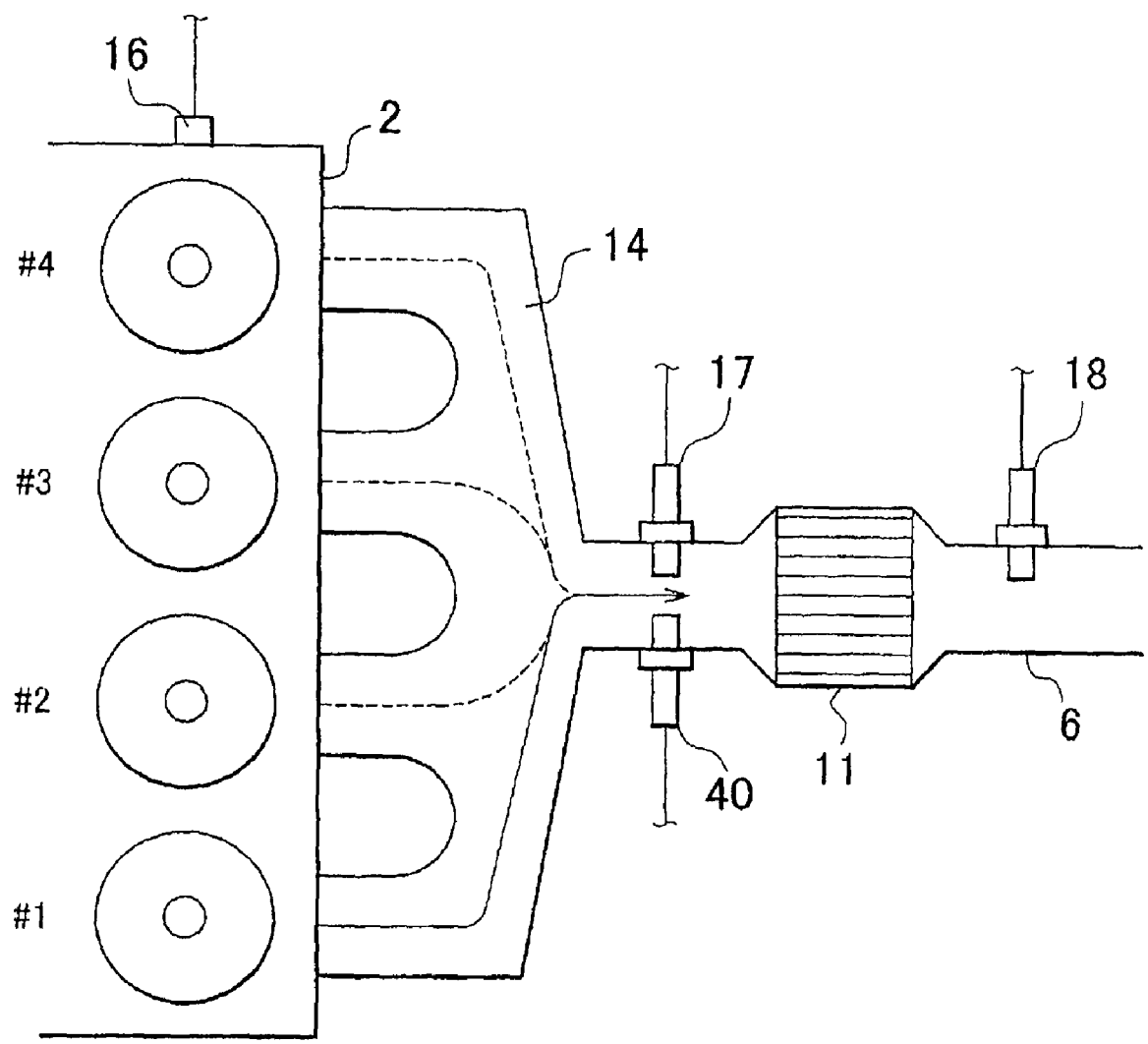
FIG. 23 is a schematic diagram showing a construction of an essential part of an additional embodiment of the invention.

As shown in FIG. 23, in this additional embodiment of the invention, a hydrogen concentration sensor 40 for detecting the concentration of hydrogen in exhaust gas is installed in the exhaust passage upstream of the catalyst 11, particularly immediately before the catalyst 11. The hydrogen concentration sensor 40 is installed substantially at the same position as the pre-catalyst sensor 17.

In this additional embodiment of the invention, an abnormality of inter-cylinder air-fuel ratio dispersion is detected by the ECU 20 on the basis of the output of the hydrogen concentration sensor 40. That is, when there is an abnormality of inter-cylinder air-fuel ratio dispersion, the concentration of hydrogen in exhaust gas is high. Therefore, using this phenomenon, the abnormality of inter-cylinder air-fuel ratio dispersion is detected. More specifically, when the output of the hydrogen concentration sensor 40 or the concentration of hydrogen detected on the basis of the output is equal to or higher than a predetermined value, it is determined that there is an abnormality of inter-cylinder air-fuel ratio dispersion. Or when an output integrated value obtained by integrating the output of the hydrogen concentration sensor 40 for a predetermined time or an integrated hydrogen concentration calculated on the basis of the output integrated value is equal to or larger than a predetermined value, it is determined that there is an abnormality of inter-cylinder air-fuel ratio dispersion. In carrying out this detection, it is preferable to use the output of the hydrogen concentration sensor at least during the performance of main air-fuel ratio feedback control. The reason for this is as follows. As long as main air-fuel ratio feedback control is performed, the concentration of hydrogen in exhaust gas ought to be confined within a certain range. On the contrary, when this concentration of hydrogen in exhaust gas is equal to or higher than a predetermined value, it can be considered that there is an abnormality of inter-cylinder air-fuel ratio dispersion. As a matter of course, it is also preferable to perform sub air-fuel ratio feedback control in conjunction with main air-fuel ratio feedback control.

Further, when an abnormality of inter-cylinder air-fuel ratio dispersion is detected, the fuel injection amount in each of the cylinders is forcibly reduced, and the output of the hydrogen concentration sensor 40 at this time is acquired, as is the case with the foregoing. Then, that one of the cylinders in which the output indicates that the concentration of hydrogen has become lower than at the time of detection of the abnormality, namely, smaller than the predetermined value is specified as an abnormal cylinder. In thus specifying the abnormal cylinder, it is preferable that at least main air-fuel ratio feedback control be performed. This is because the state of inter-cylinder air-fuel ratio dispersion is eliminated after the reduction of the fuel injection amount in the abnormal cylinder through the performance of main air-fuel ratio feedback control, and the concentration of hydrogen in exhaust gas decreases. As a matter of course, it is also preferable to perform sub air-fuel ratio feedback control in conjunction with main air-fuel ratio feedback control.

As is understood from the foregoing description, according to the invention, there is no need to detect fluctuations in the air-fuel ratio that synchronize with the rotation of the engine. Therefore, the air-fuel ratio sensor is not required to exhibit high responsiveness. Accordingly, a sensor that has degraded to a certain degree and decreased in responsiveness is also sufficiently usable. Neither a high-speed data sample nor an ECU with high processing capacity is required. Further, high resistance to disturbances and high robustness are achieved, and there is no restriction on the condition for operating the engine or the position where the sensor is installed. As described above, the invention is practical, and makes it possible to detect an abnormality with high accuracy.

Furthermore, since an abnormal cylinder can be specified, necessary maintenance, for example, the replacement of the injector in the abnormal cylinder can be swiftly and appropriately carried out at a later repair stage. As a result, a substantial improvement in practicality can be made.

Although the preferred embodiments of the invention have been described above in detail, other various embodiments of the invention are conceivable. For example, the internal combustion engine is of an intake port (intake passage) injection type. However, the invention is also applicable to a direct fuel-injection engine or a dual fuel-injection engine endowed with the function of injecting fuel in both the manners. In the foregoing embodiments of the invention, the wide range air-fuel ratio sensor is employed before the catalyst, and the $O_2$ sensor is employed behind the catalyst. However, for example, it is also appropriate to employ the wide range air-fuel ratio behind the catalyst and the $O_2$ sensor before the catalyst. Sensors for detecting the air-fuel ratio of exhaust gas in a broad sense, including this wide range air-fuel ratio sensor and this $O_2$ sensor, are referred to as air-fuel ratio sensors according to the invention. In the foregoing embodiments of the invention, the target air-fuel ratio is equally set to the stoichiometric air-fuel ratio through main air-fuel ratio control and sub air-fuel ratio control, but this is not absolutely necessary. The target air-fuel ratio in main air-fuel ratio control can also be made different from the target air-fuel ratio in sub air-fuel ratio control. Further, the target air-fuel ratio in main air-fuel ratio control and sub air-fuel ratio control may be made slightly richer than the stoichiometric air-fuel ratio when, for example, the engine is started or warmed up. The invention is applicable to such a case as well.

In the foregoing embodiments of the invention, the example in which the air-fuel ratio in one of the four cylinders of the engine (the cylinder #1) is deviant from the air-fuel ratios in the other three cylinders (the cylinders #2 to #4) to the rich side is illustrated. However, there is no limit to the number of cylinders whose air-fuel ratio is deviant to the rich side. The invention is also applicable when the air-fuel ratios in some of the cylinders (e.g., the cylinders #1 and #2) are deviant from the air-fuel ratios in the other cylinders (e.g., the cylinders #3 and #4) to the rich side. For example, when the air-fuel ratios in the cylinders #1 to #3 are deviant from the air-fuel ratio in the cylinder #4 to the rich side, the air-fuel ratio in the cylinder #4 is deviant from the air-fuel ratios in the cylinders #1 to #3 to the lean side. The invention is applicable in this case as well.

The invention is not limited to the foregoing embodiments thereof, but includes all the modification examples, application examples, and equivalents that are encompassed in the concept of the invention as prescribed by the claims. Accordingly, the invention should not be construed in a limited manner, but is also applicable to any art belonging to the scope of the concept of the invention.

What is claimed is:

1. An apparatus for detecting an abnormality of inter-cylinder air-fuel ratio dispersion in a multi-cylinder internal combustion engine, comprising:
    a catalytic element that is disposed in an exhaust passage of the multi-cylinder internal combustion engine to purify exhaust gas by oxidizing at least hydrogen contained in the exhaust gas;
    a first air-fuel ratio sensor that detects a first exhaust gas air-fuel ratio as an air-fuel ratio of exhaust gas that has not passed through the catalytic element;
    a second air-fuel ratio sensor that detects a second exhaust gas air-fuel ratio as an air-fuel ratio of exhaust gas that has passed through the catalytic element;
    an abnormality detector that detects an abnormality of inter-cylinder air-fuel ratio dispersion on a basis of a divergence state of a detected value of the second exhaust gas air-fuel ratio to a lean side from a detected value of the first exhaust gas air-fuel ratio; and an abnormal cylinder specifier that forcibly reduces fuel injection amounts in cylinders individually when an abnormality of dispersion is detected by the abnormality detector, detects a divergence state of the detected value of the second exhaust gas air-fuel ratio to the lean side from the detected value of the first exhaust gas air-fuel ratio at this time, and specifies as an abnormal cylinder that one of the cylinders in which a value indicating the divergence state has become smaller than at a time of detection of the abnormality of dispersion.

2. The apparatus according to claim 1, wherein the first air-fuel ratio sensor is disposed in the exhaust passage upstream of the catalytic element, and the second air-fuel ratio sensor is disposed in the exhaust passage downstream of the catalytic element, further comprising:

an air-fuel ratio control device that performs main air-fuel ratio control such that the detected value of the first exhaust gas air-fuel ratio coincides with a first predetermined target air-fuel ratio and performs sub air-fuel ratio control such that the detected value of the second exhaust gas air-fuel ratio coincides with a second predetermined target air-fuel ratio.

3. The apparatus according to claim 2, wherein the abnormality detector detects an abnormality of dispersion when the second exhaust gas air-fuel ratio continues to be detected as a value leaner than the first target air-fuel ratio for a time equal to or longer than a predetermined time during control performed by the air-fuel ratio control device, and the abnormal cylinder specifier acquires a detected value of the second exhaust gas air-fuel ratio at a time of forcible reduction of the fuel injection amounts in the respective cylinders during control performed by the air-fuel ratio control device, and specifies as an abnormal cylinder that one of the cylinders in which the detected value is richer than a value detected at a time of detection of the abnormality of dispersion.

4. The apparatus according to claim 2, wherein the air-fuel ratio control device calculates a control amount for the sub air-fuel ratio control on a basis of an output of the second air-fuel ratio sensor, the abnormality detector detects an abnormality of dispersion when the control amount becomes equal to or larger than a predetermined value with which the second exhaust gas air-fuel ratio is corrected further to the rich side during control performed by the air-fuel ratio control device, and the abnormal cylinder specifier acquires a value of the control amount at a time of forcible reduction of the fuel injection amount in each of the cylinders during control performed by the air-fuel ratio control device, and specifies as an abnormal cylinder that one of the cylinders in which the value of the control amount is smaller than a value at a time of detection of the abnormality of dispersion.

5. The apparatus according to claim 2, wherein the air-fuel ratio control device forcibly sets the first target air-fuel ratio in the main air-fuel ratio control to a value richer than a reference value, the abnormality detector detects an abnormality of dispersion when the second exhaust gas air-fuel ratio continues to be detected as a value leaner than the second target air-fuel ratio for a time equal to or longer than a predetermined time, and the abnormal cylinder specifier acquires a detected value of the second exhaust gas air-fuel ratio at a time of forcible reduction of the fuel injection amount in each of the cylinders during control performed by the air-fuel ratio control device, and specifies as an abnormal cylinder that one of the cylinders in which the detected value is richer than a value detected at a time of detection of the abnormality of dispersion.

6. The apparatus according to claim 2, wherein the first target air-fuel ratio and the second target air-fuel ratio are set equal to a stoichiometric air-fuel ratio.

7. The apparatus according to claim 1, wherein the catalytic element is disposed in a sensor element of the second air-fuel ratio sensor, the abnormality detector detects an abnormality of dispersion when the detected value of the second exhaust gas air-fuel ratio is leaner than the detected value of the first exhaust gas air-fuel ratio by a value equal to or larger than a predetermined value, and the abnormal cylinder specifier acquires the detected value of the second exhaust gas air-fuel ratio at a time of forcible reduction of the fuel injection amount in each of the cylinders, and specifies as an abnormal cylinder that one of the cylinders in which the detected value has become closer to the detected value of the first exhaust gas air-fuel ratio than at a time of detection of the abnormality of dispersion.

8. A method for detecting an abnormality of inter-cylinder air-fuel ratio dispersion in a multi-cylinder internal combustion engine equipped with a catalytic element that is disposed in an exhaust passage of the multi-cylinder internal combustion engine to purify exhaust gas by oxidizing at least hydrogen contained in the exhaust gas, a first air-fuel ratio sensor that detects a first exhaust gas air-fuel ratio as an air-fuel ratio of exhaust gas that has not passed through the catalytic element, and a second air-fuel ratio sensor that detects a second exhaust gas air-fuel ratio as an air-fuel ratio of exhaust gas that has passed through the catalytic element, comprising:

detecting an abnormality of inter-cylinder air-fuel ratio dispersion on a basis of a divergence state of a detected value of the second exhaust gas air-fuel ratio to a lean side from a detected value of the first exhaust gas air-fuel ratio; and forcibly reducing fuel injection amounts in cylinders individually when an abnormality of dispersion is detected by the abnormality detector, detecting the divergence state of the detected value of the second exhaust gas air-fuel ratio to the lean side from the detected value of the first exhaust gas air-fuel ratio at this time, and specifying as an abnormal cylinder that one of the cylinders in which a value indicating the divergence state has become smaller than at a time of detection of the abnormality of dispersion.

* * * * *